(12) United States Patent
Wolfe

(10) Patent No.: US 6,292,813 B1
(45) Date of Patent: *Sep. 18, 2001

(54) SYSTEM AND METHOD FOR COMMUNICATING INFORMATION RELATING TO A NETWORK RESOURCE

(76) Inventor: Mark A. Wolfe, 1076 Tamberwood Ct., Woodbury, MN (US) 55125

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,756

(22) Filed: Nov. 17, 1998

Related U.S. Application Data

(60) Provisional application No. 60/066,058, filed on Nov. 17, 1997.

(51) Int. Cl.[7] .............................. G06F 15/00; G06F 17/00; G06F 17/21; G06F 17/24
(52) U.S. Cl. ............................................................ 707/513
(58) Field of Search ..................................... 707/513, 514, 707/100, 501; 395/615, 329, 333, 200.66

(56) References Cited

U.S. PATENT DOCUMENTS

| | | |
|---|---|---|
| 4,586,035 | 4/1986 | Baker . |
| 4,723,211 | 2/1988 | Barker et al. ......................... 364/300 |
| 4,730,252 | 3/1988 | Bradshaw ............................. 364/403 |
| 4,815,029 | 3/1989 | Barker et al. ......................... 364/900 |
| 4,850,007 | 7/1989 | Marino .................................. 379/67 |
| 4,855,725 | 8/1989 | Fernandez ............................ 345/173 |
| 4,899,292 | 2/1990 | Montagna ............................ 707/501 |
| 4,945,476 | 7/1990 | Bodick et al. .................... 364/413.02 |
| 4,954,969 | 9/1990 | Tsumura ............................... 364/521 |
| 4,996,642 | 2/1991 | Hey ....................................... 705/27 |
| 5,021,989 | 6/1991 | Fujisawa et al. ..................... 364/900 |
| 5,062,074 | 10/1991 | Kleinberger ......................... 364/900 |
| 5,105,184 | 4/1992 | Pirani et al. ......................... 340/721 |
| 5,123,088 | 6/1992 | Kasahara et al. ..................... 395/600 |
| 5,157,783 | 10/1992 | Anderson et al. .................... 395/600 |
| 5,206,949 | 4/1993 | Cochran et al. ...................... 395/600 |
| 5,220,648 | 6/1993 | Sato ...................................... 395/146 |
| 5,235,680 | 8/1993 | Bijnagte ............................... 395/161 |
| 5,241,671 | 8/1993 | Reed et al. ........................... 395/600 |
| 5,253,337 | 10/1993 | Hirose .................................. 395/161 |
| 5,255,386 | 10/1993 | Prager .................................. 395/600 |
| 5,265,065 | 11/1993 | Turtle .................................... 395/600 |
| 5,289,569 | 2/1994 | Taniguchi ............................. 395/145 |
| 5,321,740 | 6/1994 | Gregorek ............................... 379/67 |

(List continued on next page.)

OTHER PUBLICATIONS

Martin Roscheisen et al., Computer Networks and ISDN Systems, Apr. –1995, The Internaltional Journal of Computer and Telecommunications Networking, pp. 739–749.*

Blight, "Annotated Reference List Agents," IEEE, May 23, 1997, pp. 7–12.

Discovering Westlaw: The Essential Guide (4th ed.) (1995 West Publishing Company).

Frelechoux, "An Architecture to Support Personalized Web Applications," Apr. 7, 1997.

Brown, Using Netscape 2, pp. 773–786 (Que 1995).

*Primary Examiner*—Jack Choules
*Assistant Examiner*—Linh M Pham

(57) ABSTRACT

A system and method for communicating information relating to a network resource. Upon detecting a hypertext document displayed on the screen a request identifying the document to a supplemental information server and retrieving information related to the hypertext document. The supplemental information is also displayed and the user may be provided opportunity to select further information or links. Guiding individuals to places of interest on a network where information is stored, and/or displaying or otherwise presenting useful information to the user.

9 Claims, 45 Drawing Sheets

U.S. PATENT DOCUMENTS

| | | | |
|---|---|---|---|
| 5,325,298 | 6/1994 | Gallant | 364/419.19 |
| 5,335,277 | 8/1994 | Harvey | 380/20 |
| 5,341,293 | 8/1994 | Vertelney | 395/600 |
| 5,347,632 | 9/1994 | Filepp et al. | 395/200 |
| 5,390,281 | 2/1995 | Luciw et al. | 395/12 |
| 5,392,387 | 2/1995 | Fitzpatrick et al. | 395/156 |
| 5,404,442 | 4/1995 | Foster | 395/159 |
| 5,408,655 | 4/1995 | Oren et al. | 395/600 |
| 5,418,948 | 5/1995 | Turtle | 395/600 |
| 5,421,008 | 5/1995 | Banning et al. | 395/600 |
| 5,459,306 | 10/1995 | Stein et al. | 235/383 |
| 5,471,575 | 11/1995 | Giansante | 395/144 |
| 5,478,989 | 12/1995 | Shepley | 235/375 |
| 5,495,581 | 2/1996 | Tsai | 395/154 |
| 5,524,193 | 6/1996 | Covington | 707/512 |
| 5,526,520 | 6/1996 | Krause | 707/104 |
| 5,544,352 | 8/1996 | Egger | 395/600 |
| 5,572,643 | 11/1996 | Judson | 395/793 |
| 5,617,526 | 4/1997 | Oran et al. | 395/326 |
| 5,623,679 | 4/1997 | Rivette et al. | 395/773 |
| 5,632,022 | 5/1997 | Warren | 345/350 |
| 5,644,686 | 7/1997 | Hekmatpur | 706/45 |
| 5,692,107 | 11/1997 | Simudis | 395/50 |
| 5,696,965 | 12/1997 | Dedrick | 395/610 |
| 5,706,452 | 1/1998 | Ivanov | 395/331 |
| 5,706,507 * | 1/1998 | Schloss | 395/615 |
| 5,715,445 | 2/1998 | Wolfe | 707/5 |
| 5,765,138 | 6/1998 | Aycock | 705/7 |
| 5,768,578 | 6/1998 | Kirk | 707/100 |
| 5,778,398 | 7/1998 | Nagashima | 707/501 |
| 5,781,189 | 7/1998 | Holleran | 345/335 |
| 5,802,292 | 9/1998 | Mogul | 395/200.33 |
| 5,822,539 * | 10/1998 | Van Hoff | 395/200 |
| 5,826,025 | 10/1998 | Gramlich | 395/200.47 |
| 5,826,267 | 10/1998 | McMillan | 707/9 |
| 5,826,269 | 10/1998 | Hussey . | |
| 5,860,074 | 1/1999 | Rowe | 707/526 |
| 5,864,850 | 1/1999 | Nordman | 707/10 |
| 5,870,770 | 2/1999 | Wolfe | 707/501 |
| 5,878,421 * | 3/1999 | Ferrel et al. | 707/100 |
| 5,890,172 * | 3/1999 | Borman et al. | 707/501 |
| 5,905,492 * | 5/1999 | Straub et al. | 345/333 |
| 5,913,040 | 6/1999 | Rakavy . | |
| 5,915,256 | 6/1999 | Rogers | 707/501 |
| 5,933,811 | 8/1999 | Angles . | |
| 5,946,682 | 8/1999 | Wolfe | 707/5 |
| 5,948,061 | 9/1999 | Merriman et al. | 709/219 |
| 5,959,621 * | 9/1999 | Nawaz et al. | 345/329 |
| 5,959,623 | 9/1999 | van Hoff . | |
| 5,960,409 * | 9/1999 | Wexler | 705/14 |
| 5,963,205 * | 10/1999 | Sotomayor | 345/333 |
| 6,006,252 | 12/1999 | Wolfe | 709/203 |
| 6,011,537 | 1/2000 | Slotznick . | |
| 6,023,698 | 2/2000 | Lavey | 707/10 |
| 6,034,680 | 3/2000 | Kessenich | 345/329 |
| 6,094,675 | 7/2000 | Sunaga | 709/204 |
| 6,138,128 | 10/2000 | Perkowitz | 707/501 |
| 6,151,603 | 11/2000 | Wolfe | 707/10 |
| 6,216,141 | 4/2001 | Straub | 707/513 |

\* cited by examiner

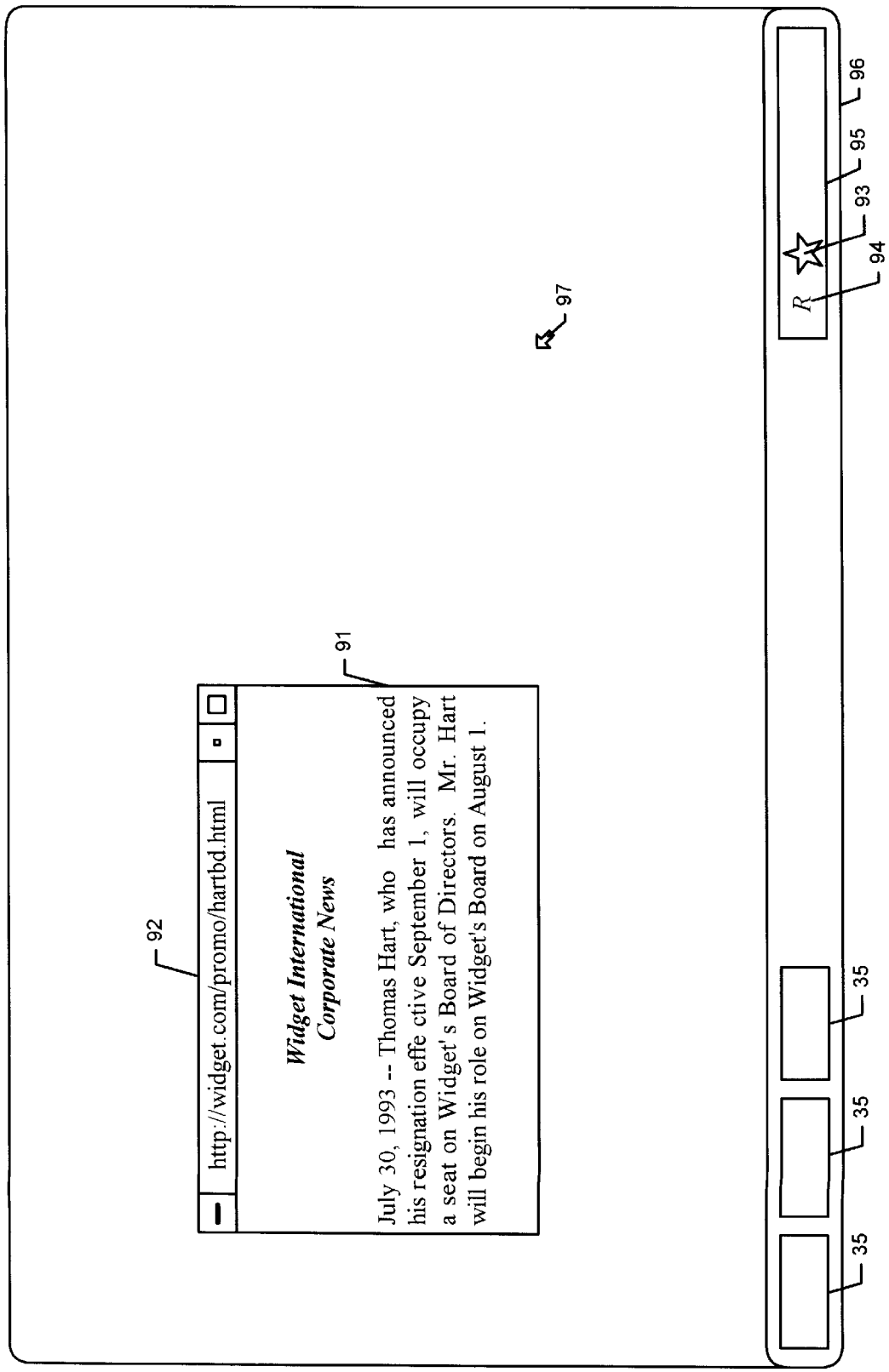

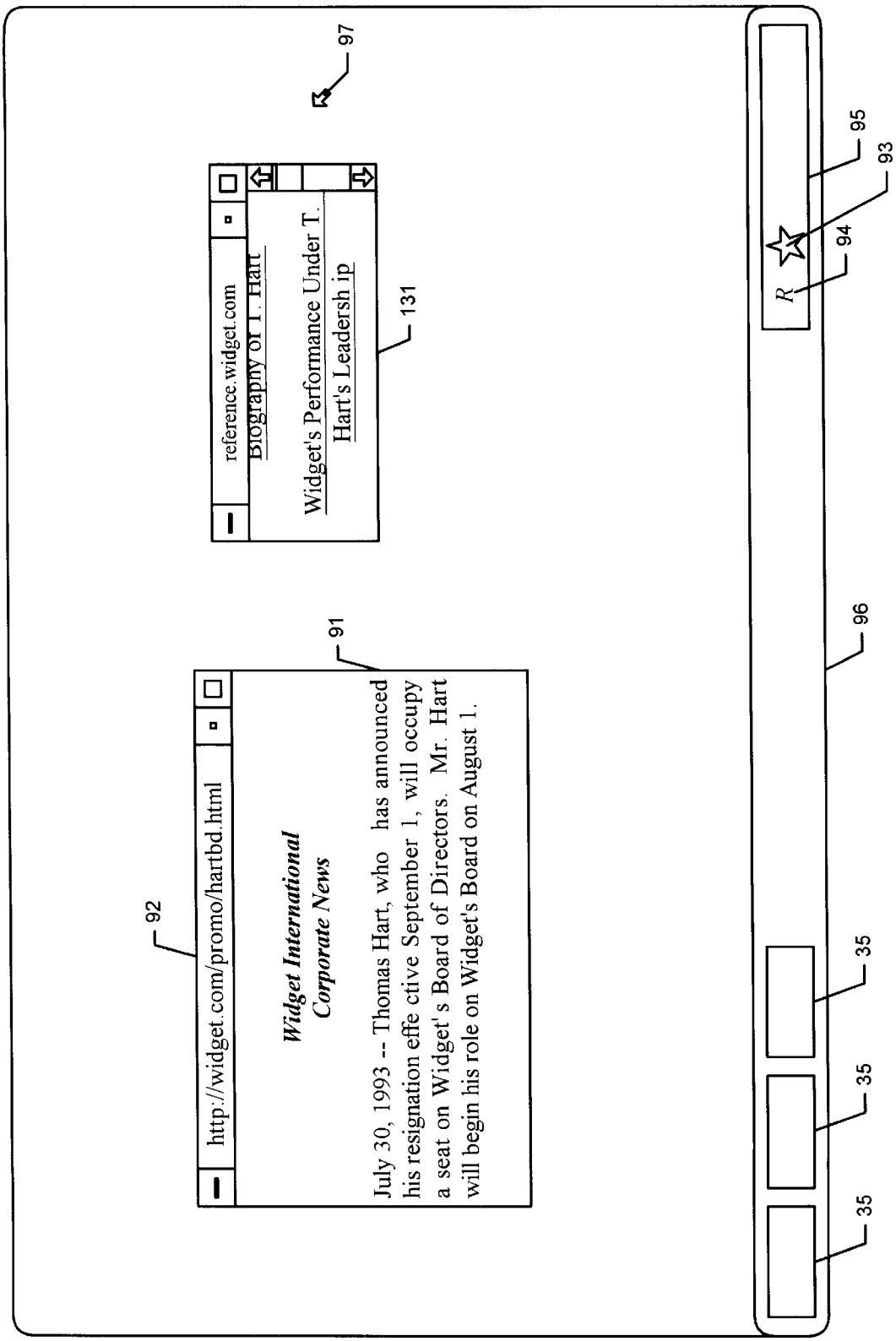

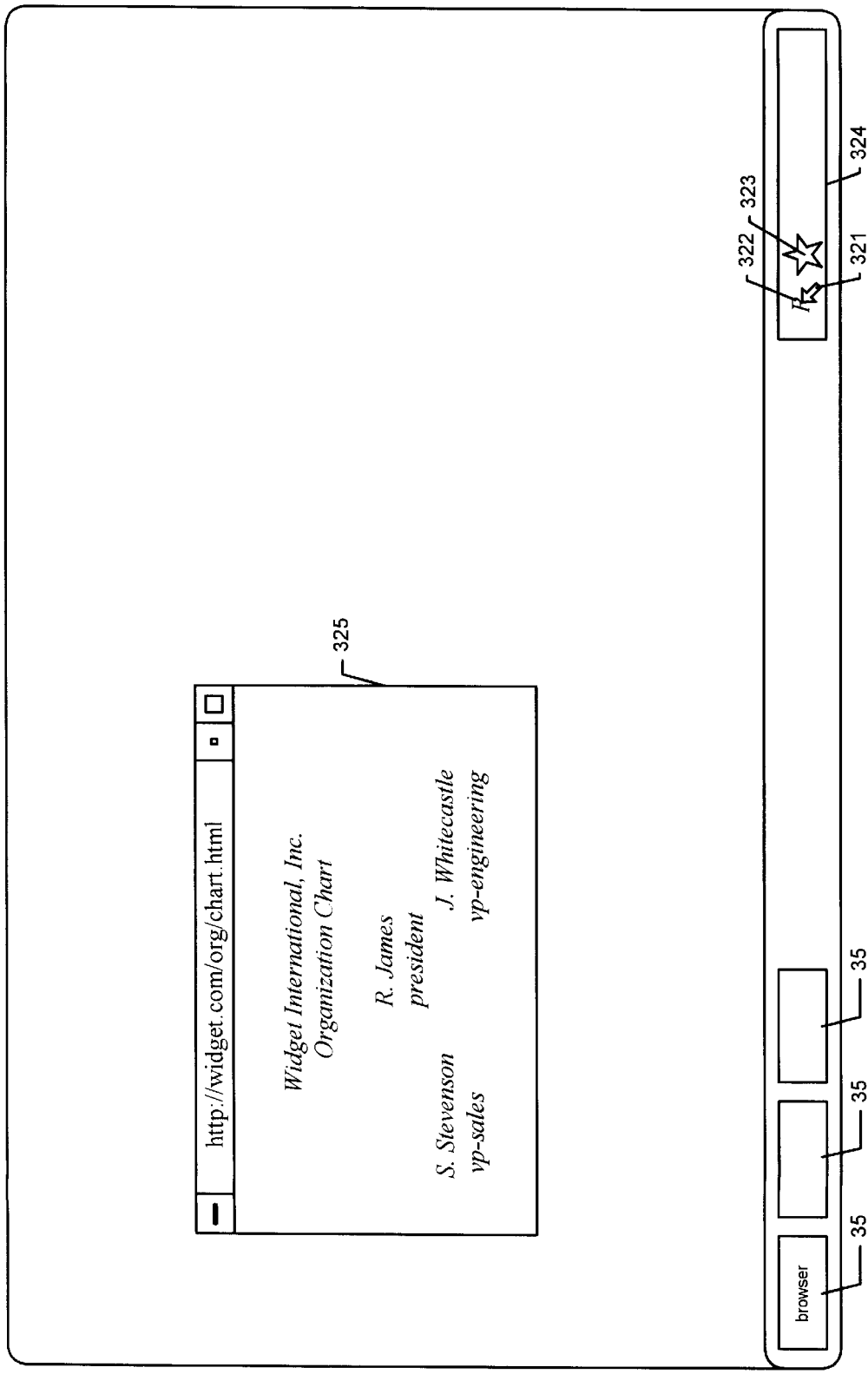

SYSTEM AND METHOD FOR COMMUNICATING INFORMATION RELATING TO A NETWORK RESOURCE

CROSS REFERENCE TO RELATED PROVISIONAL APPLICATION

This application claims the benefit of provisional application serial No. 60/066,058 (entitled "A System and Method for Communicating Information Relating to a Network Resource"), filed Nov. 17, 1997. That application is hereby incorporated by reference.

BACKGROUND AND SUMMARY

A continuing difficulty in today's information-rich society is the effective communication of pertinent information to individuals who are most interested in such information. Some of the systems and methods disclosed herein relate to the fields of information retrieval and information presentation. Specific embodiments and features, and the nature of the present invention may be understood by reference to the following detailed description and the drawings.

BRIEF DESCRIPTION OF DRAWINGS

FIGS. 3, 4, 7, 8, 9–14, 15–17, 19–21, and 26–32 are representations of screen displays illustrating various aspects or features of one or more disclosed inventions.

DETAILED DESCRIPTION

Figure 1:
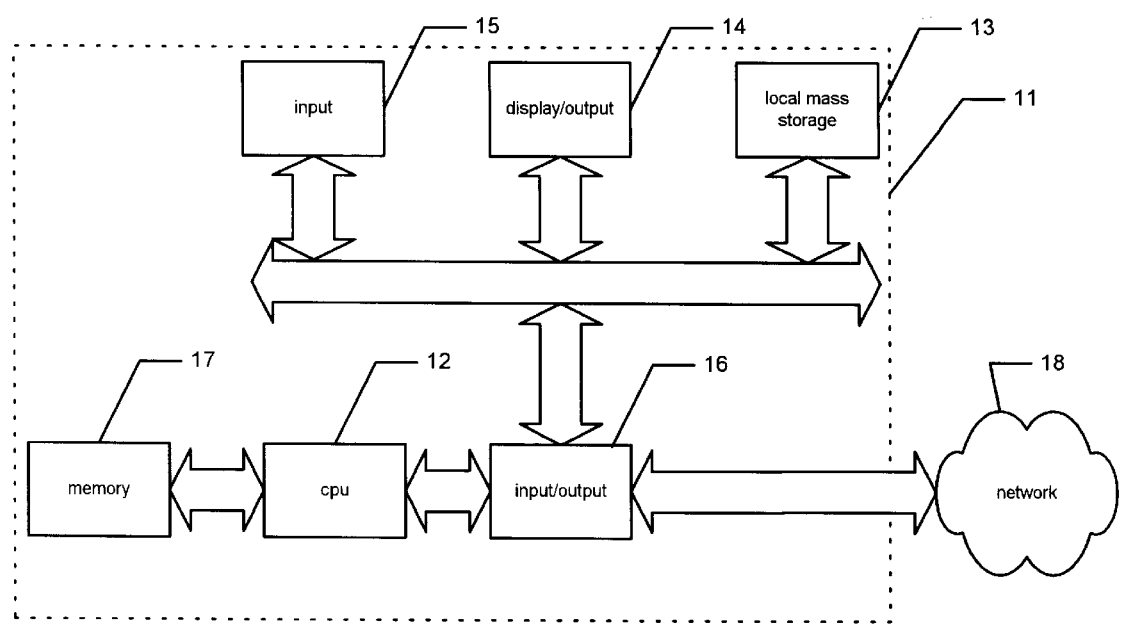
FIGS. 1, 2, 5, and 18 are diagrams illustrating various aspects or features of one or more disclosed inventions.

FIG. 1 is a block diagram of a general purpose computer 11. The computer 11 has a central processing unit (CPU) 12, memory 17, and input/output (i/o) circuitry 16. The CPU 12 is connected to the memory 17 and the i/o circuitry 16. The i/o circuitry permits the CPU 12 to access various peripheral devices, such as the display 14, local storage 13, and input device(s) 15. The input device(s) 15 may include a keyboard, mouse, pen, voice-recognition circuitry and/or software, or any other input device. Some type of secondary or mass storage 13 is generally used, and could be, for example, a hard disk or optical drive. The storage 13 can also be eliminated by providing a sufficient amount of memory 17. Either the storage 13 or the memory 17 could act as a program storage medium that holds instructions or source code. The i/o circuitry 16 is also connected to a network 18, thereby connecting the computer 11 to other computers or devices.

Figure 2:
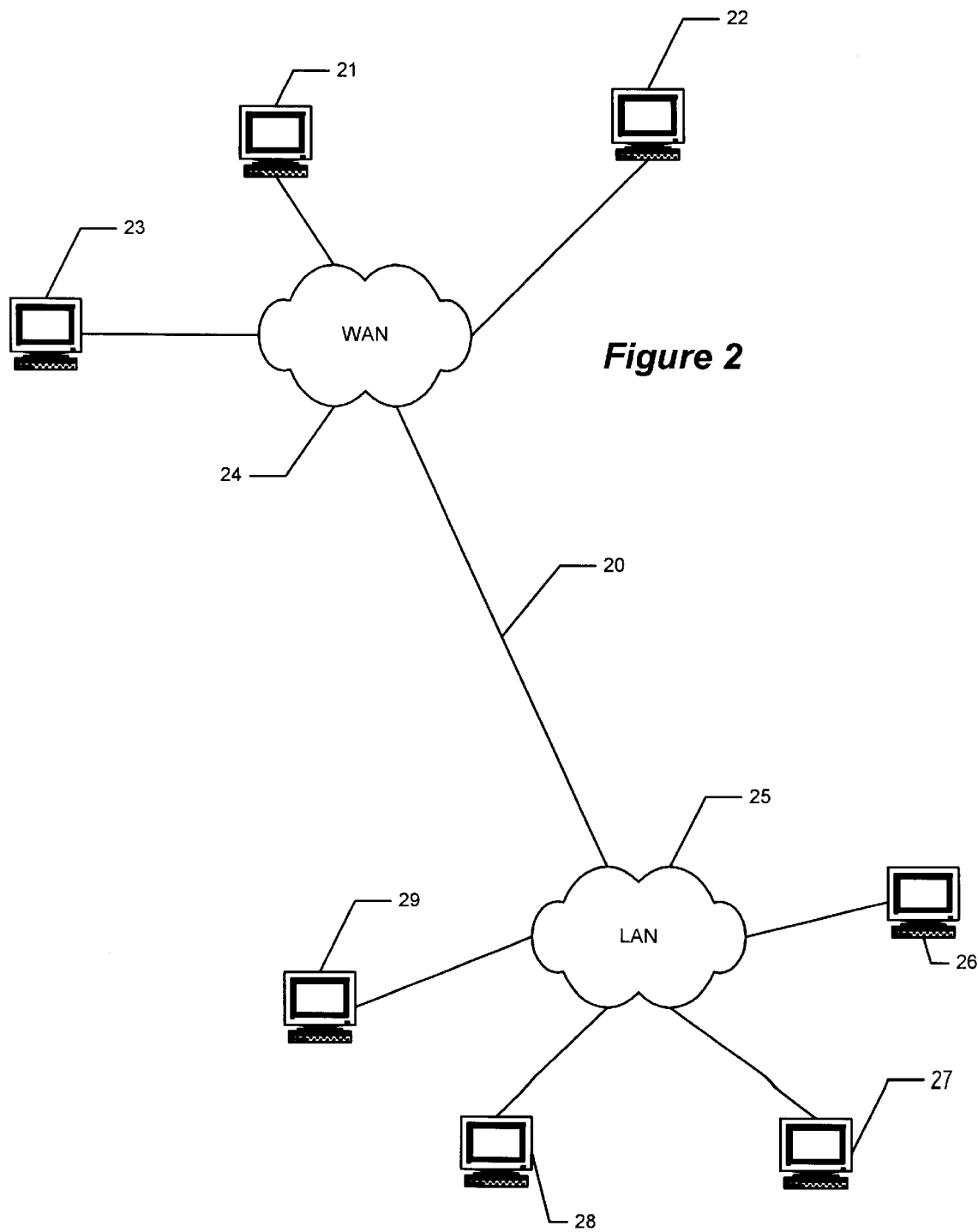

FIG. 2 is a representation of multiple computers (21, 22, 23, 26, 27, 28, and 29) connected together to form a network 18 of computers and/or networks. One or more of the computers on the network 18 may be of the type illustrated in FIG. 1. Computers 21, 22, and 23 are shown connected to wide area network (WAN) 24, whereas computers 26, 27, 28, and 29 are shown interconnected by local area network (LAN) 25. The LAN 25 is connected to the WAN 24 by connection 20.

Figure 3:
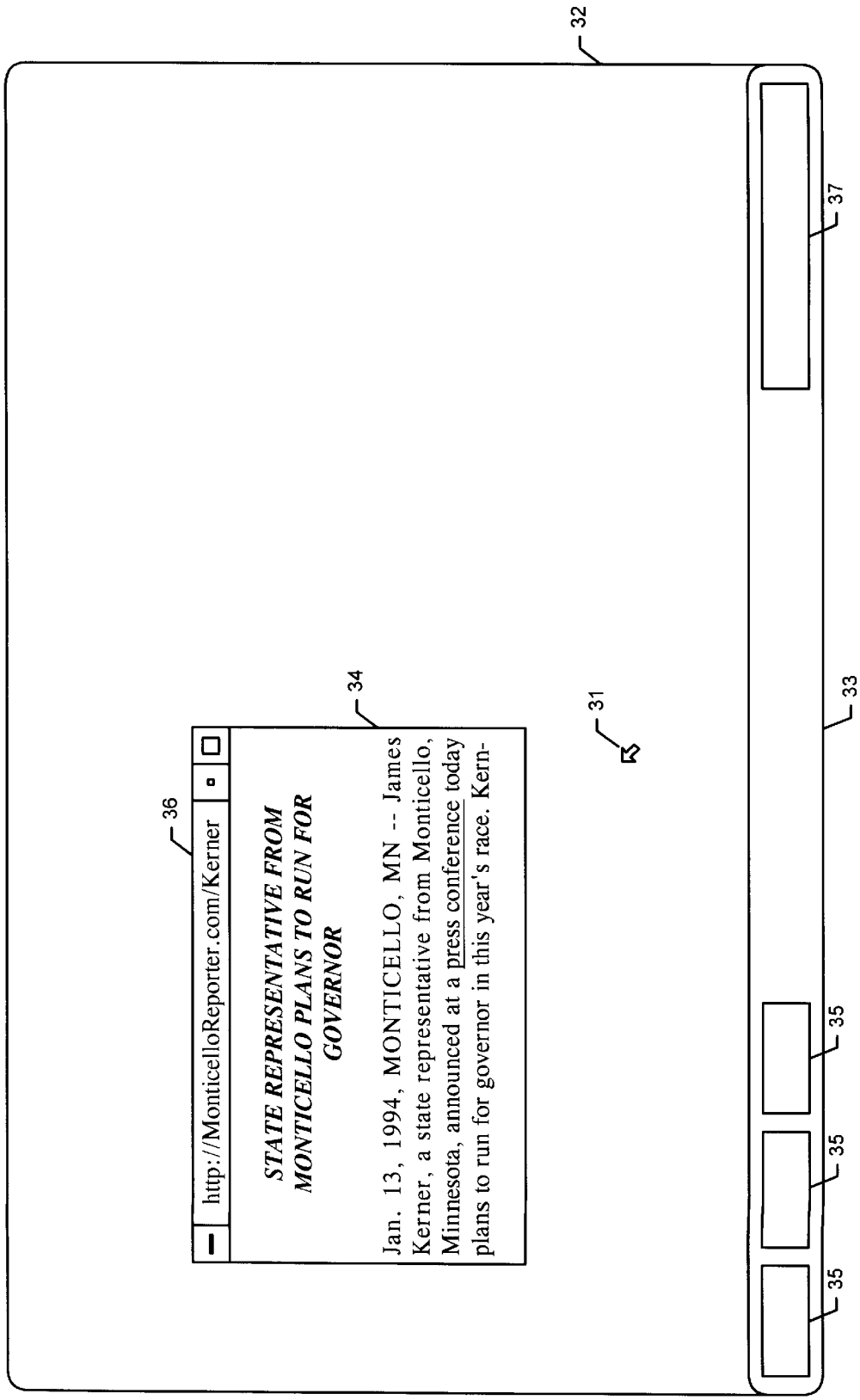

FIG. 3 shows a simplified representation of a video display screen 32 for a computer such as that of FIG. 1. The area 32 represents the area on a screen within which images, text, video, and other type of data or multimedia objects can be displayed and manipulated. Shown on the display 32 are a cursor 31, a taskbar 34, application bars 35 on the taskbar, and an icon tray 37.

Another type of object, window 34, is also shown on the display screen 32. The window 34 is a representation of a document retrieval, browsing, and/or viewing program that is used to view or interact with information or resources either stored locally on the computer or retrieved over a network. Such a program will hereinafter be referred to as a "browser," but it should be understood that this term is meant to encompass other types of programs should be given a broad interpretation. The window 34 has a title area 36 that displays the title of the page, document, or network resource being presented or displayed, along with the server on which the document is located. Often this information is put in the form of a universal resource locator (URL) of the document being displayed, as is shown in FIG. 3. Alternatively, an additional area within the window could be used for displaying the universal resource locator, as is found in most commercially available browsers. Other navigation buttons are usually also associated with a browser program and the window 36, but for simplicity, these buttons and other navigational aids have been omitted from the Figures.

In operation, the user browses information on a network or even on a local storage device, and causes information to be displayed within the window 34. In FIG. 3, the user has retrieved the document identified by the URL "http://MonticelloReporter.com/Kerner," which is displayed in the browser window 34. As this document is retrieved and rendered in the window 34, another display element or window 41 is added to the display screen in the manner shown in FIG. 4. Window 41 has a title bar 42, and an area 43 having two buttons 44 and 45. The configured "reference server" is also shown within the area 43. The window 41 displays information relating in some way to the information in window 34. In some implementations, the window 41 is automatically displayed on the screen whenever the user browses to a page or location on the network. Each time the user browses to such a page or location, the window 41 is updated to display information that relates to that page or location. The information shown in window 41 that relates to the page, location, or document shown the window 34 may be referred to as supplemental information. The supplemental information is retrieved using the "reference server" identified in the area 43, as is described below.

The information in window 34 is taken from the "MonticelloReporter.com" server, and represents a news story published by the "Monticello Reporter" about a state representative's plans to seek the office of governor. The information in window 41 is taken from the "TwinCitiesTimes.com" server, and in this particular situation, is a version of the same story published by the Twin Cities Times, which may be a publisher that competes with the Monticello Reporter.

Where there is more than a single window 34 displayed, or where more than one network resource is being presented to the user, the user can select the window or network resource for which he or she seeks supplemental information. Alternatively, supplemental information may be retrieved for some or all of the network resources being displayed or otherwise presented to the user, so that supplemental information relating to more than one network resource is made available to the user. In another implementation, only that supplemental information that is common to more than one of the documents or other network resources being displayed can be made available to the user.

Figure 4:
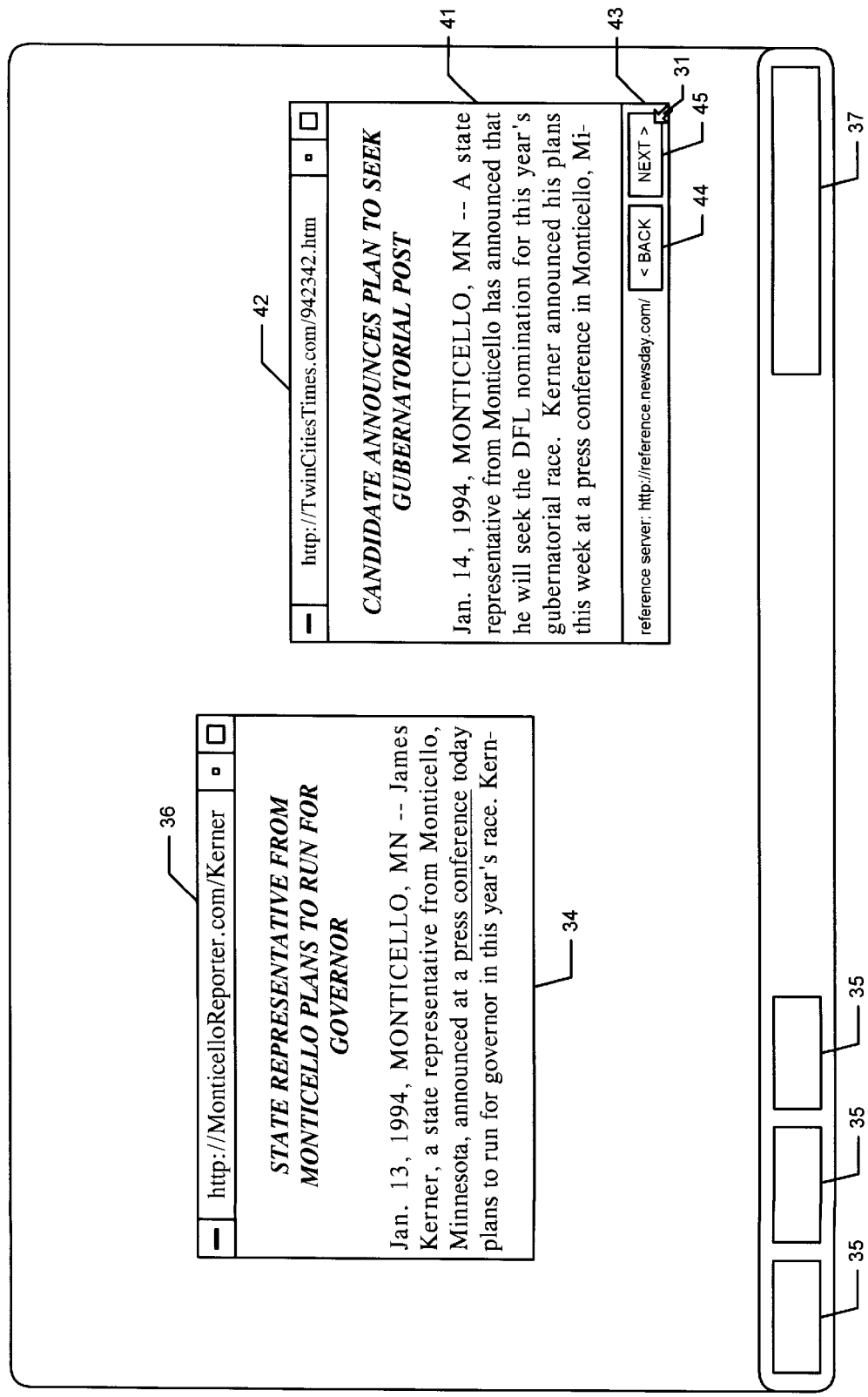
Figure 5:
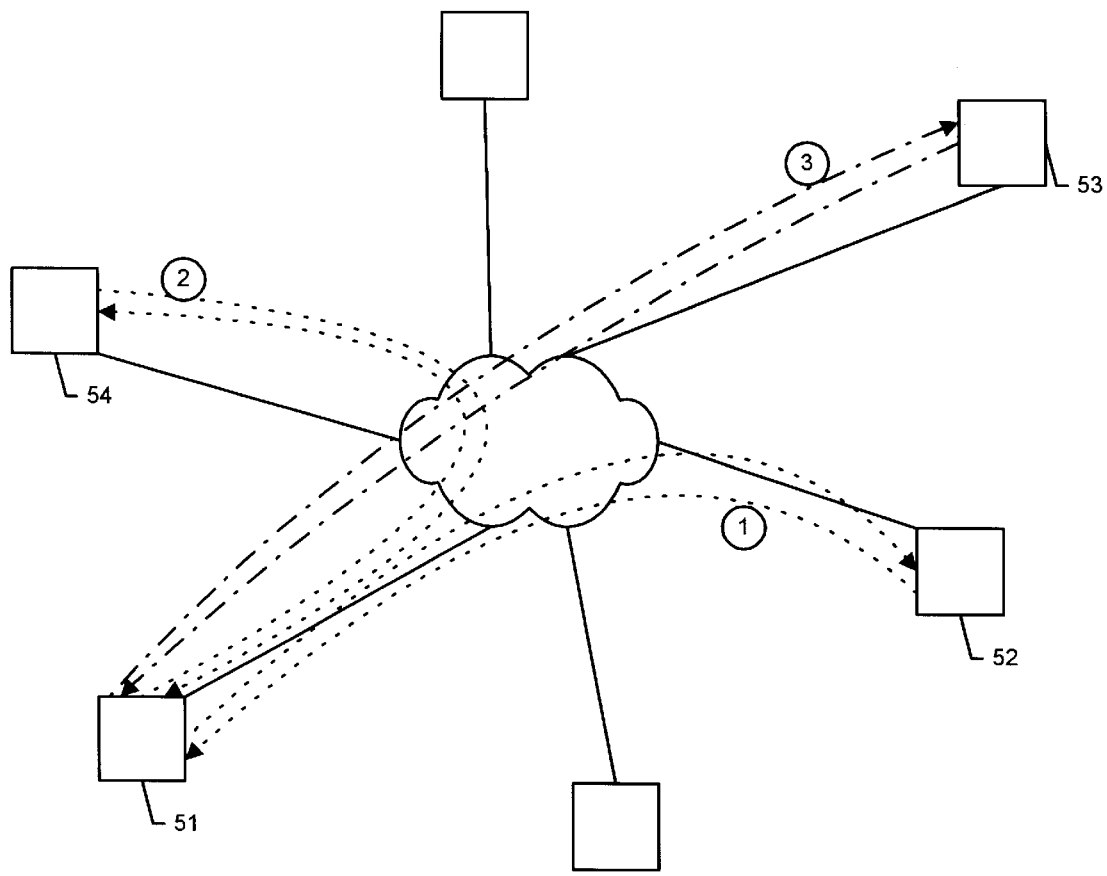

FIG. 5 illustrates a diagram one possible implementation of how supplemental information is retrieved over the network using a reference server. Shown in FIG. 5 is network having on it a number of computers or other devices, including devices 51 to 54. The device 51 is a client computer that has the browser program of FIGS. 3 and 4 executing on it. In FIG. 5, the client computer 51 sends a request to device 52, asking for the "Kerner" document. The device 52, which represents the "MonticelloReporter.com" domain, responds by sending the requested document to the client computer 52. The client computer 51 displays the "Kerner" document as shown in window 34 in FIGS. 3 and 4. The client computer also sends a request to the configured reference server, asking for supplemental information about the "Kerner" document. As shown in FIG. 5, the reference server for the client computer 51 is the device 54, which acts as the "reference.newsday.com" computer identified in the area 43 in FIG. 4. The device 54 (i.e., the "reference server") responds by identifying the "TwinCitiesTimes.com/ 942342.htm" document. The client computer then requests this document from the "TwinCitiesTimes.com" server, which is the device 53. When the device 53 sends the requested document to the client computer 51, the "TwinCitiesTimes.com/942342.htm" document is displayed in window 41, as shown in FIG. 4.

Figure 6:
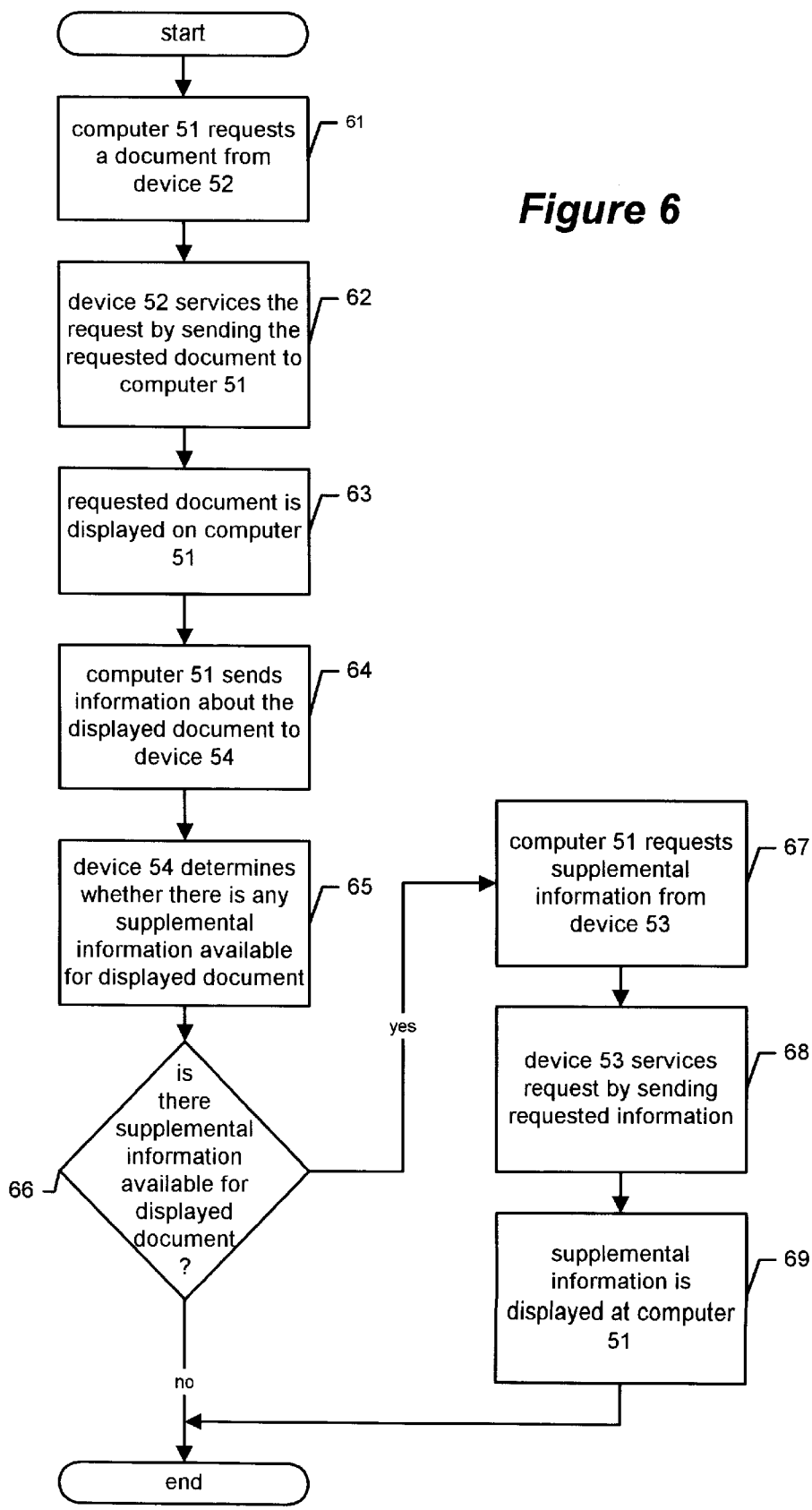
FIGS. 6, and 22–25, are flow charts illustrating various aspects or features of one or more disclosed inventions.

FIG. 6 illustrates a flow chart of the process described in connection with FIGS. 3 to 5. The client computer first requests a document from the device 52, and then displays the document at 63 when it is received from the device 52. The client computer 51 then sends a request to device 54, which acts as a reference server for client 51, for supplemental information about the document retrieved from device 52. The reference server 52 responds by sending the identity of one or more instances of information (e.g., documents) located on device 54. The client computer 51 then retrieves and displays at least one of those documents. In other embodiments, the device 52 may itself have supplemental information, and could respond to the client computer's request by sending that information, rather than the location of where the client could find supplemental information.

In the flow chart of FIG. 6, the display of the document retrieved from device 52 takes place before the computer 51 initiates a request to the reference server 54. However, in other embodiments, the request to the reference server 54 can take place much earlier, perhaps as soon as the client computer knows of the identity of the document that it is retrieving from computer 52.

Referring again to FIG. 4, the user selects with the cursor 31 the display element 45 within window 41. Upon selection of this display element 45, the display is updated to that shown in FIG. 7. The information displayed in window 41 is different than that of FIG. 4, but it still relates to the information shown in window 34. The information displayed in window 41 of FIG. 7 is a story published by the "Rochester Reporter" that updates the news report displayed in the window 34, and is another instance of supplemental information relative to the information displayed in the browser window 34.

Where more than one document or instance of supplemental information is available for the document displayed in the window 34, the user can step through each instance of supplemental information by manipulating the buttons 44 and 45. Selection of the "back" display element 44 in FIG. 7 will cause the previous instance of supplemental information to be displayed (i.e., the information in window 41 of FIG. 4). Where there is more than one instance of supplemental information for a particular document, supplemental information that the user has not yet seen could be placed ahead of other instances of supplemental information, so that the user sees them first when the user steps through the instances of supplemental information. In general, the order of the instances of supplemental information can be chosen so as to make stepping through the instances of supplemental information convenient. A visual or audio indicator or signal could also be provided in connection with window 41 to communicate the status of the supplemental information being displayed. Such status may be that the supplemental information is new, old, recently added as supplemental information, updated, and/or modified. Maintaining a profile for each user will allow the client computer to determine the status of supplemental information, relative to each user.

Figure 7:
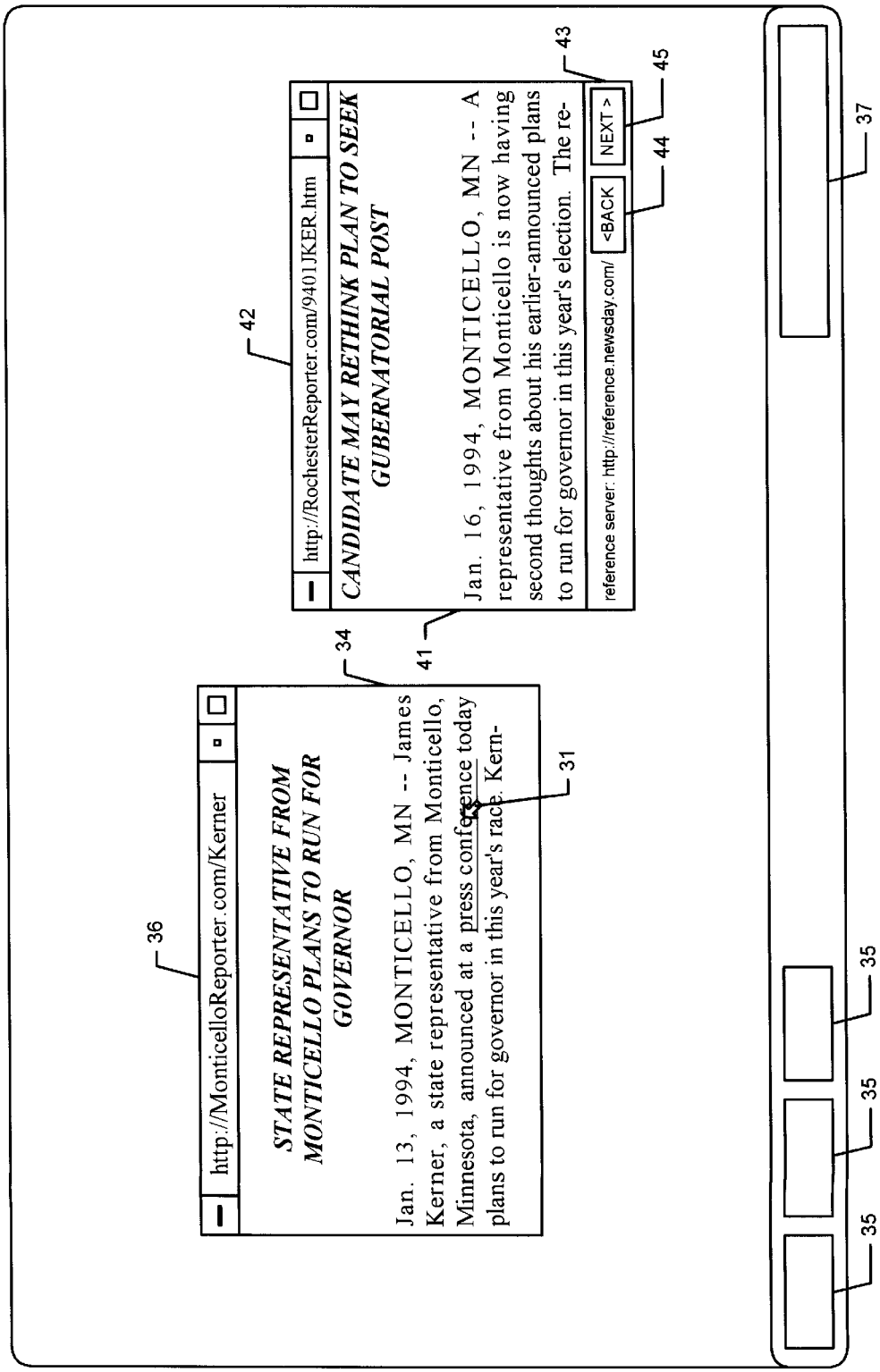
Figure 8:
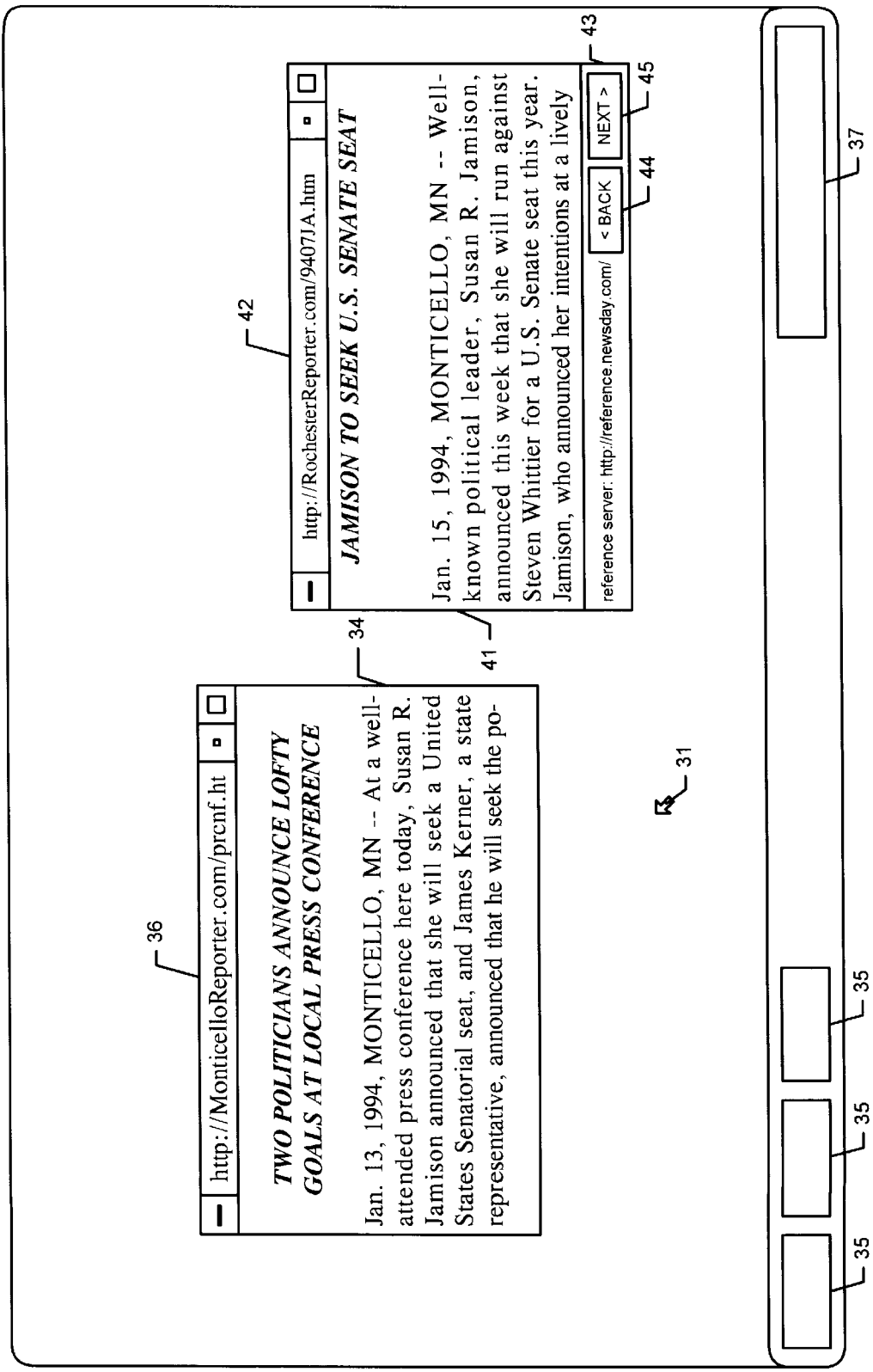

In FIG. 7, the user selects a link in browser window 34 using the cursor 31. Upon selection of the link, the display is updated as shown in FIG. 8. The window 34 in FIG. 8 has been updated to display the document represented by the selected link in window 34 in FIG. 7. In addition, the information in window 41 is updated to display supplemental information relating to the information displayed in the browser window 34 of FIG. 8, rather than the browser window 34 of FIG. 7. The information in window 41 of FIG. 7 may not be supplemental information relative to the "MonticelloReporter.com/prcnf.htm" now displayed in window 34 in FIG. 8, so the window 41 is updated. The information shown in window 41 of FIG. 8 is considered supplemental information relating to the "MonticelloReporter.com/prcnf.htm" document.

Figure 9:
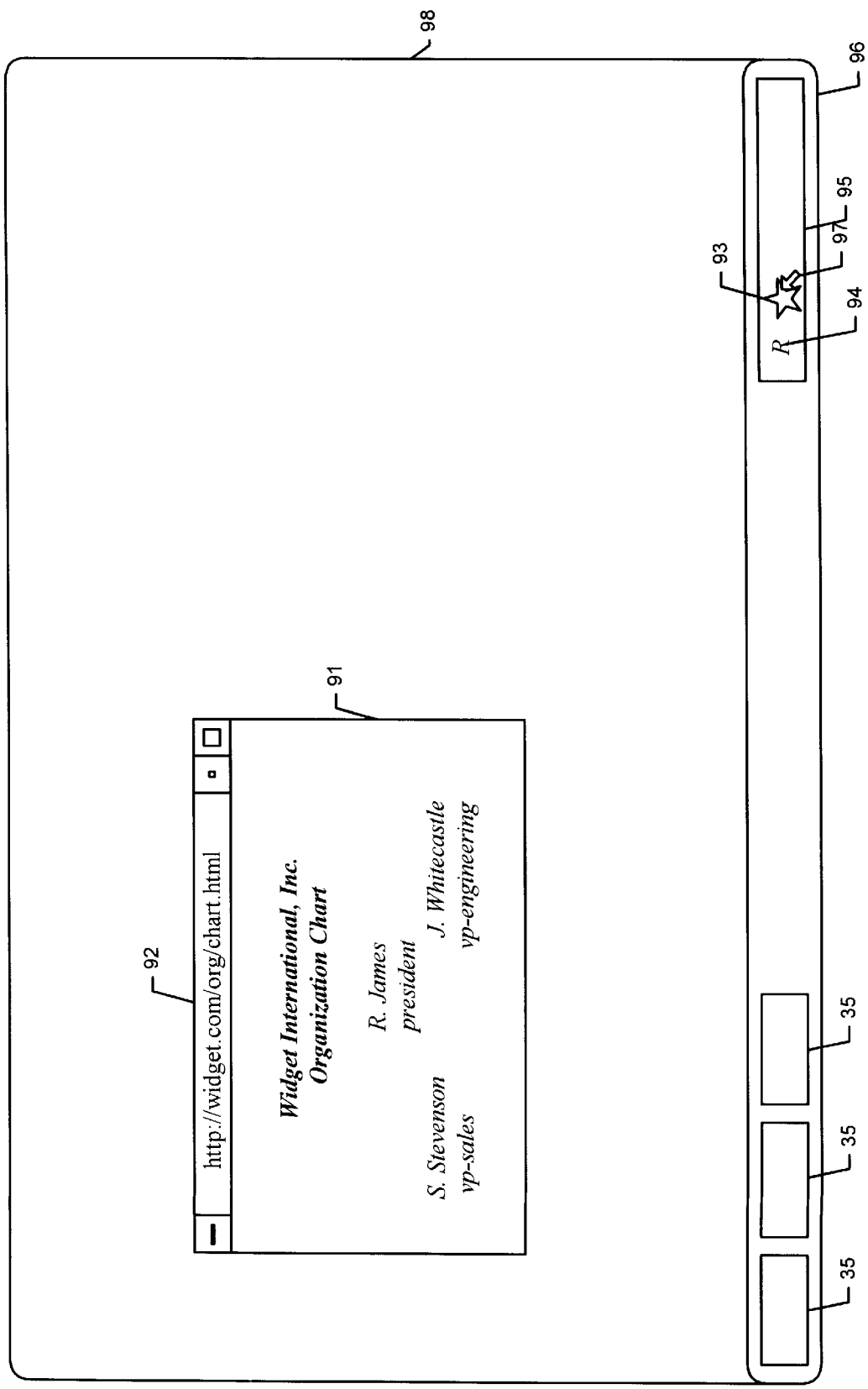
Figure 10A:
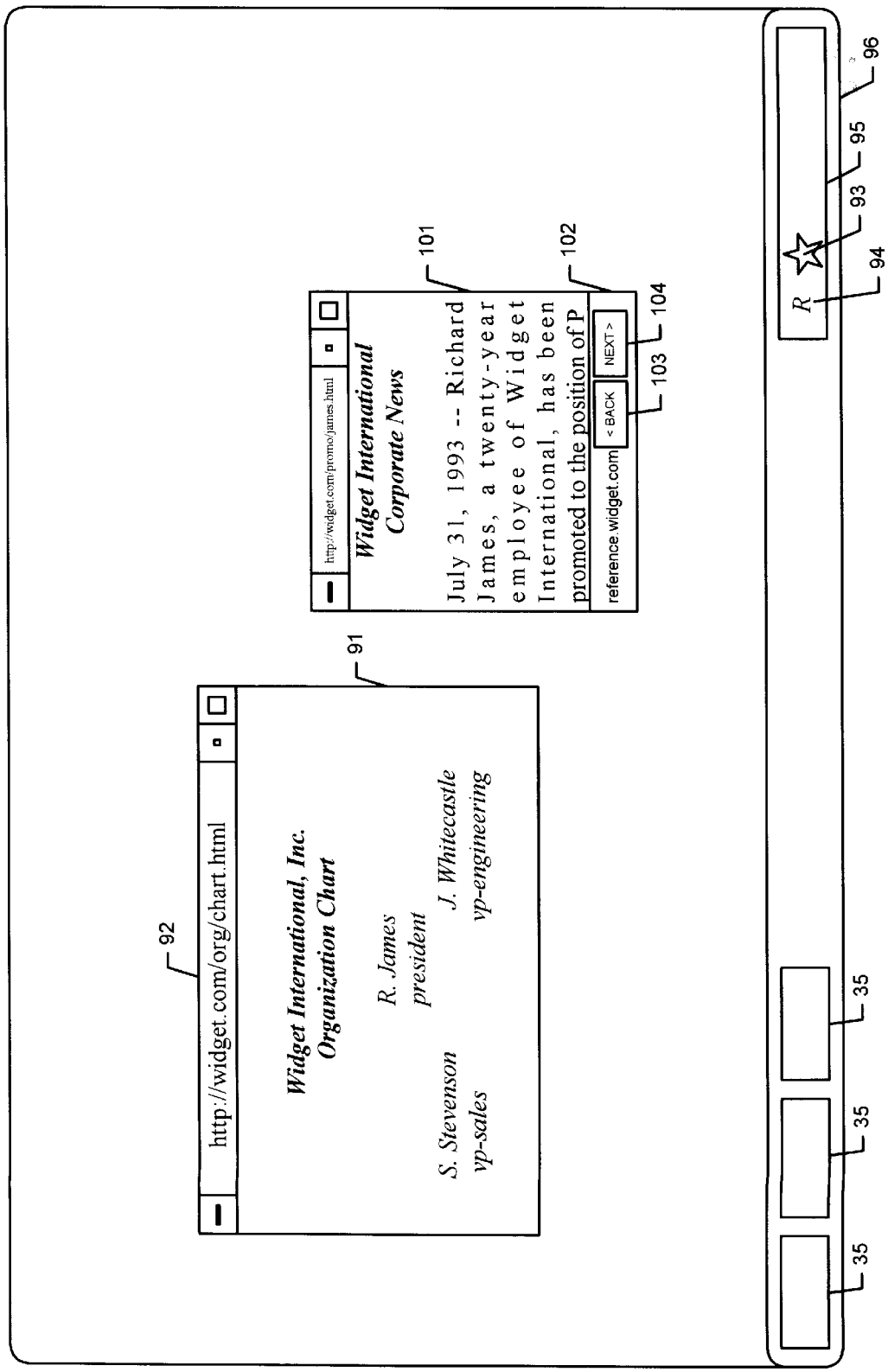

In FIG. 9, a window 91 from a browser program is shown on a display screen 98. The window has a title bar 92 identifying the document displayed in the window 92 as "http://widget.com/org/chart.html." The display screen 98 has a task bar 96, and an icon tray 95 on the taskbar 96. Display elements 94 and 93 are shown in the icon tray 95. Using the cursor 97, the user selects display element 93, which causes the display to be updated to that of FIG. 10a. In FIG. 10a, the window 101 appears in response to the selection of display element 93, and this window 101 contains supplemental information relating to the information displayed in browser window 91. The area 102 in window 101 has display elements 103 and 104, which can be used to step through additional supplemental information for the document shown in browser window 91, if such additional supplemental information is available. Also shown in the area 102 is the particular reference server being used (i.e., "reference.widget.com").

Figure 10B:
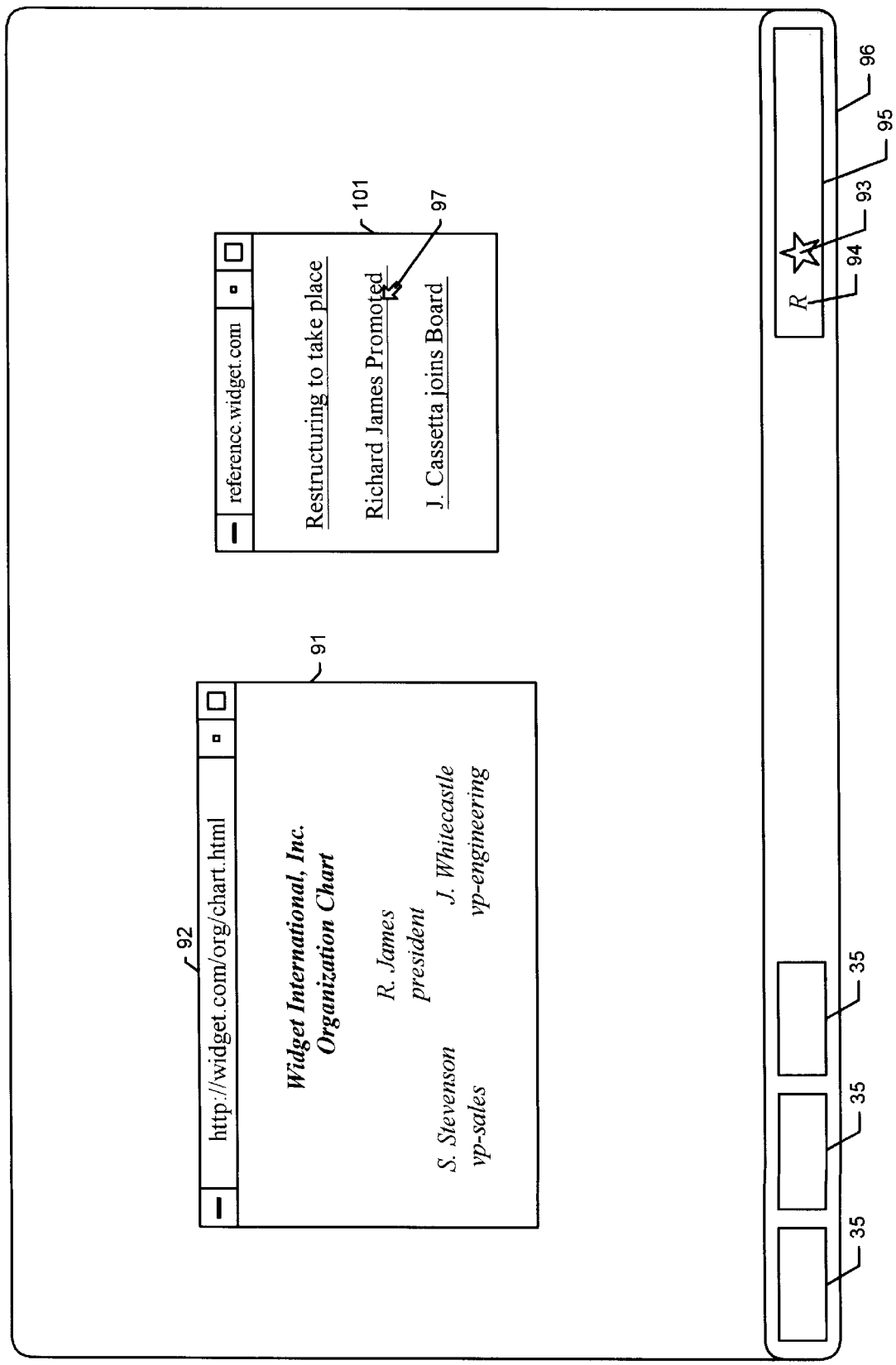

In an alternate embodiment, selection of the display element 93 in FIG. 9 causes the display to be updated to that shown in FIG. 10b. The window 101 in Figure 10b displays references or links to supplemental information, rather than the article shown in the window 101 of FIG. 10a. The user can select one of the references or links shown in window 101 in FIG. 10b to see the article or information associated with that link. For example, in FIG. 10b, the user selects a reference in the window 101 using the cursor 97. Upon selection of the reference in FIG. 10b, the display is updated to that shown in FIG. 11. The information in the browser window 91 is updated to show the information referred to by the selected link in window 101, which happens to be the same article displayed in the window 101 of FIG. 10a.

Figure 11:
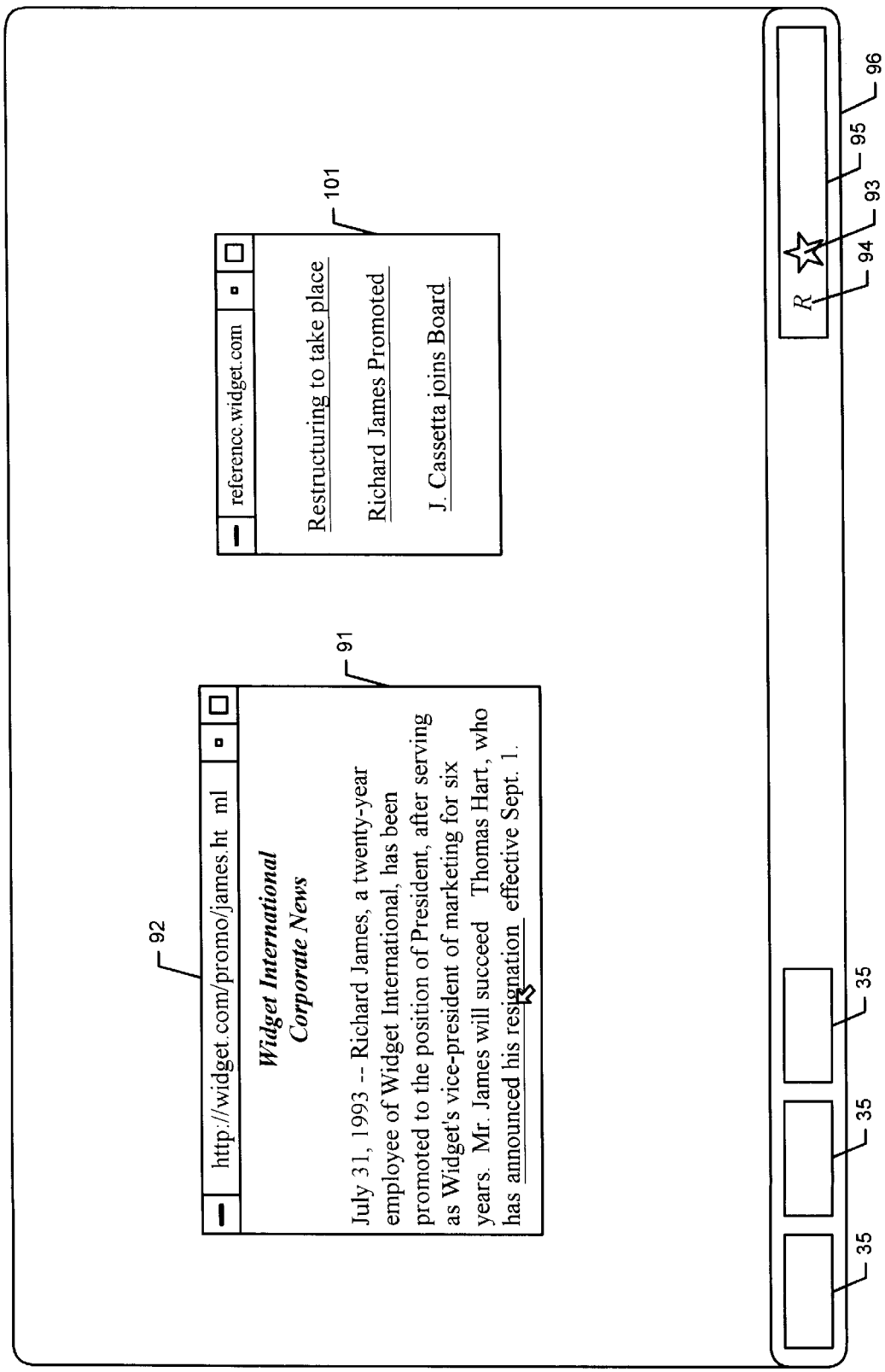

In the embodiment shown in FIG. 11, the window 101 remains on the screen and continues to display the same links as those shown in FIG. 10b. A different document has been displayed in the browser window 91 in FIG. 11, and the links shown in window 101 may not represent supplemental information relative to the new document displayed in the browser window 91. However, in this particular implementation, the links in window 101 stay the same as those in FIG. 10b so that the user can select the other instances of supplemental information shown in window 101 in FIG. 10b.

Figure 12B:
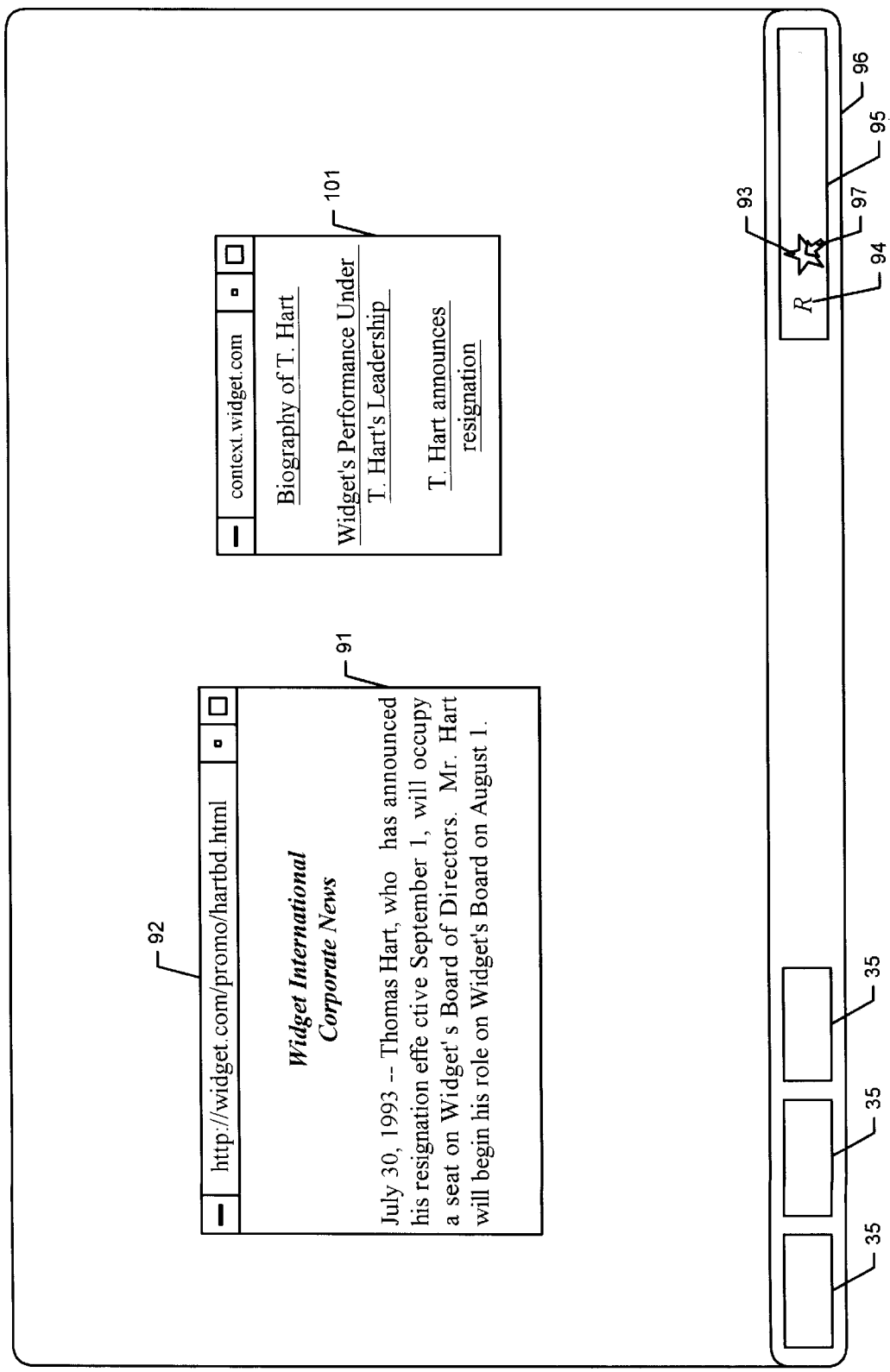

Referring again to FIG. 11, the user selects the "announced his resignation" link in window 91, which causes the display to be updated to that shown in FIG. 12a, where window 91 displays the document selected in FIG. 11. The window 101 has been removed from the display. In the embodiment shown in FIG. 12a, where the user has browsed to a new location, such as by selecting a link in the browser window 91, or by specifying a new URL to the browser program, the window 101 is removed from the display. Selection of display element 93 will again display window 101, as shown in FIG. 12b. The links or references in window 101 in FIG. 12b are to supplemental information relating to the newly displayed document ("http://widget.com/promo/hartbd.html") in the window 91.

FIG. 13 shows another implementation of a window 131 showing references to supplemental information for a displayed browser window 91. As shown in FIG. 13, references to supplemental information can be displayed in a scrolling window 131.

Figure 14A:
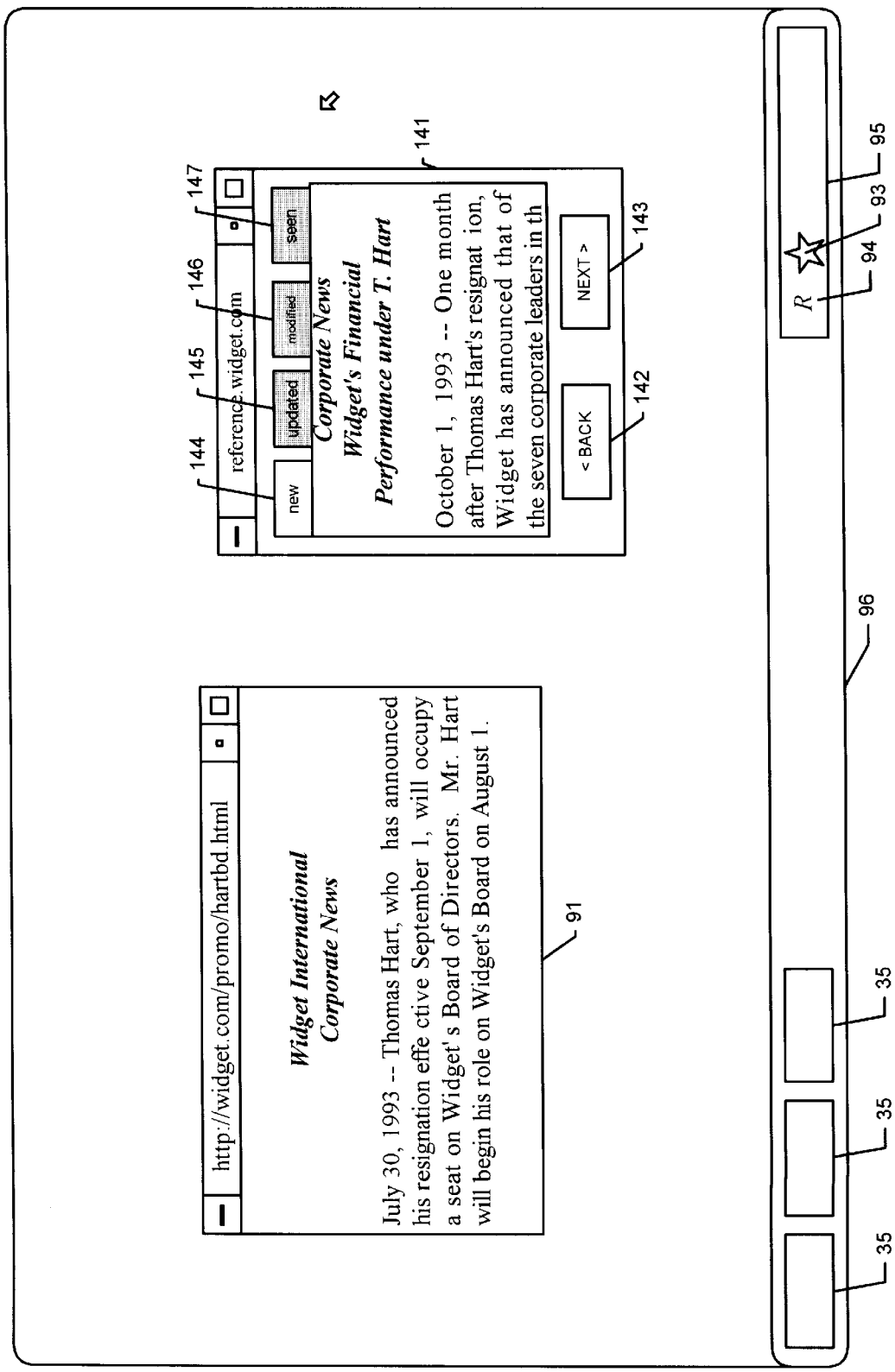

FIG. 14a illustrates another possible implementation of a window 141 for displaying supplemental information. As shown in FIG. 14a, supplemental information can be divided into a number of categories. In window 141, supplemental information is divided into "new," "updated," "modified," and "seen" categories. The "new" category is for supplemental information or documents that the user has not yet seen. The "updated" category is for supplemental information or documents that the user has seen, but that have been updated since the user has last seen them. Documents that fall into this category might be published by news reporters or reporting agencies, where these documents are regularly updated. A similar category is "modified" which is used for supplemental information that have already been presented to the user, but where the document(s) have been in some way modified since the user has last seen them. The fourth category is for documents that have already been seen by the user, and that have not been updated or modified. In FIG. 14a, the user is looking at a supplemental information document from the "new" category, as indicated by the tab 144. The remaining tabs 145, 146, and 147, which represent the other three categories, are shaded to indicate that they are not in use. The user may see supplemental information in these other categories by selecting (e.g., with the cursor 97) one of the other tabs 145, 146, and 147. The user can also step through other instances of supplemental information in the "new" category by selecting the display elements 142 and 143, as previously described.

Figure 14B:
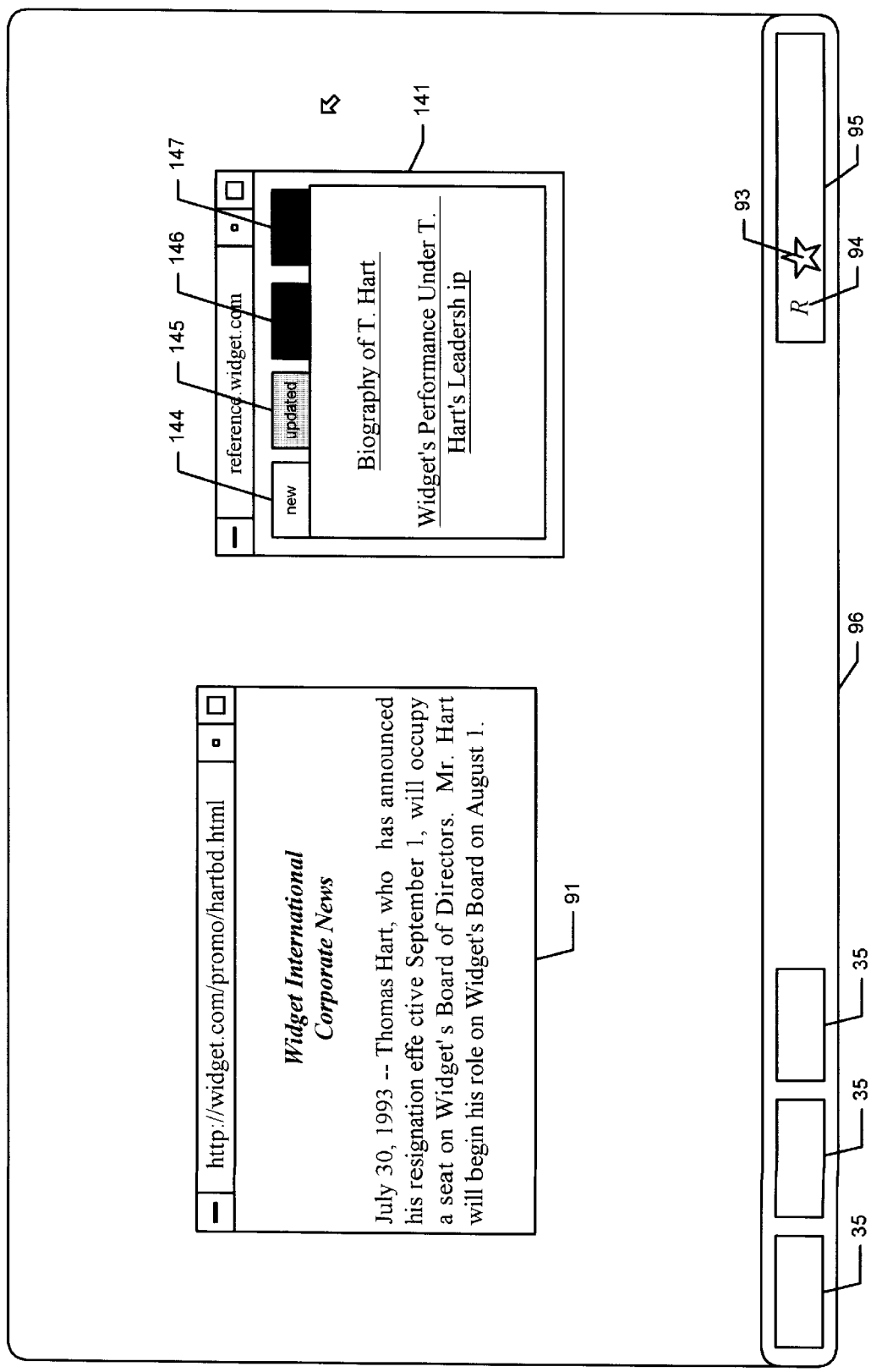

In an alternate embodiment, shown in FIG. 14b, each category tab has a list of references or links to supplemental information that can be selected by the user. Like FIG. 14a, the tabs 144, 145, 146, and 147 can be selected by the user to display the list of links to supplemental information. The embodiments of FIGS. 14a and 14b would generally require a profile for each user, which would contain information about the documents that the user has previously seen. Such a profile would enable a determination of whether a particular document is in the "new," "updated," "modified," or "seen" category. This profile information could be stored on the client computer, on the reference server, on a combination of both, or on some other server.

The categories described in connection with FIGS. 14a and 14b are illustrative, and it should be understood that fewer categories may be appropriate for some situations, and that additional categories may be used.

Figure 15:
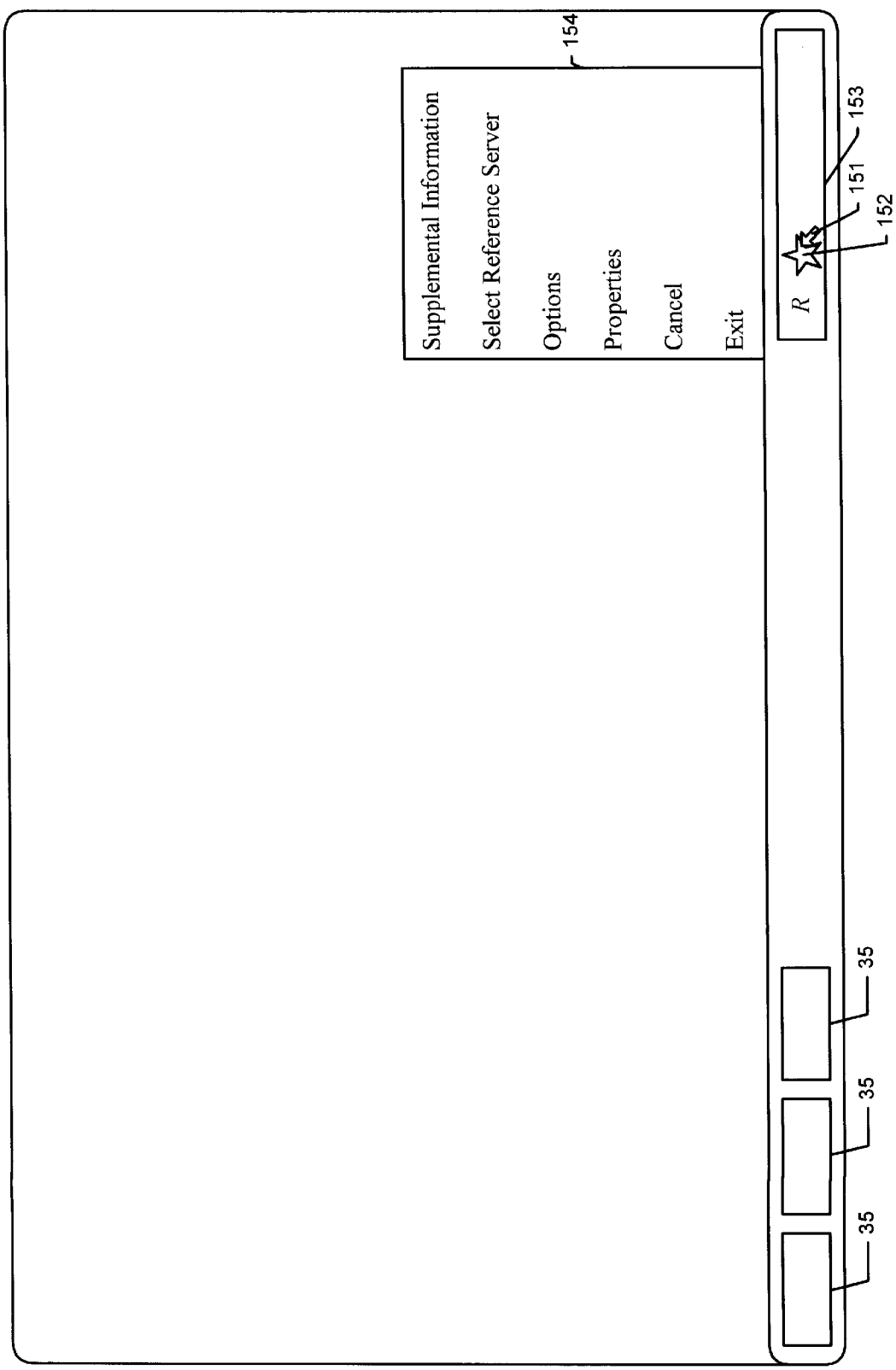

In FIG. 15, the user selects the display element 152 with the cursor 151, which causes a menu 154 to be displayed. In some embodiments, the display element 152 is selected using a special selection action, such as a "right" mouse click, thereby permitting normal selection of the display element 152 to perform other actions. The first menu selection, "Supplemental Information," causes supplemental information about a network resource to be retrieved from a reference server, and presented to the user. In FIG. 15, however, no network resource or document is displayed on the screen or otherwise being presented to the user. Therefore, the "Supplemental Information" menu selection is not available in the situation shown in FIG. 15. When the user displays or otherwise selects a network resource about which supplemental information could be presented, the "Supplemental Information" menu selection becomes available.

Figure 16A:
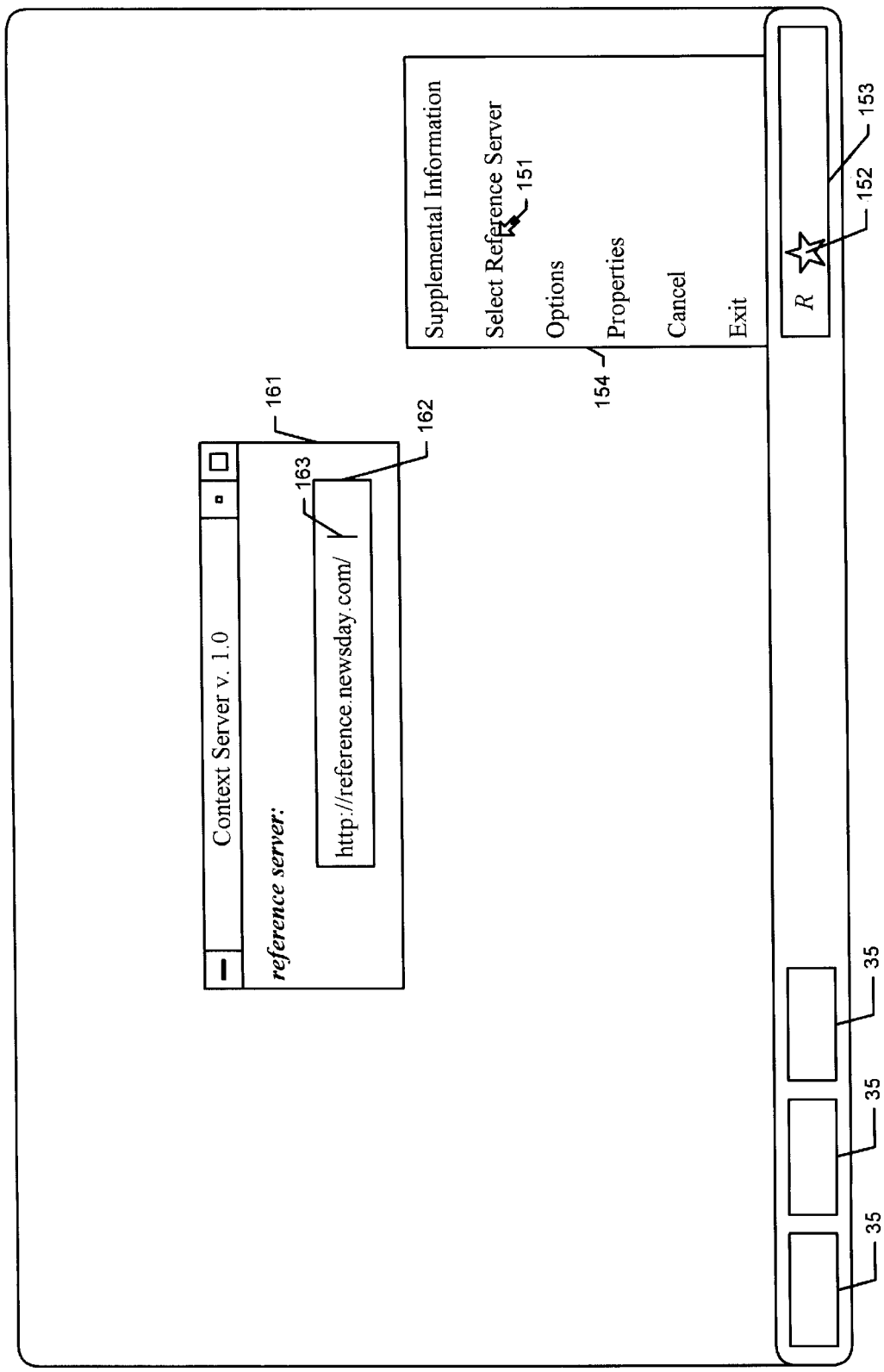

In FIG. 16a, the user has selected the "Select Reference Server" menu item, which causes the window 161 to be displayed. In the window 161 is an edit box 162 with the currently selected reference server identified within the box 162. The window 161 is used for configuring or choosing a reference server for the client computer. Selecting or changing the reference server for the client computer is accomplished by editing the name of the reference server in the edit box 162. The cursor 163 indicates the ability to edit the contents of the box 162, and type the URL or other identifier of the desired reference server.

Figure 16B:
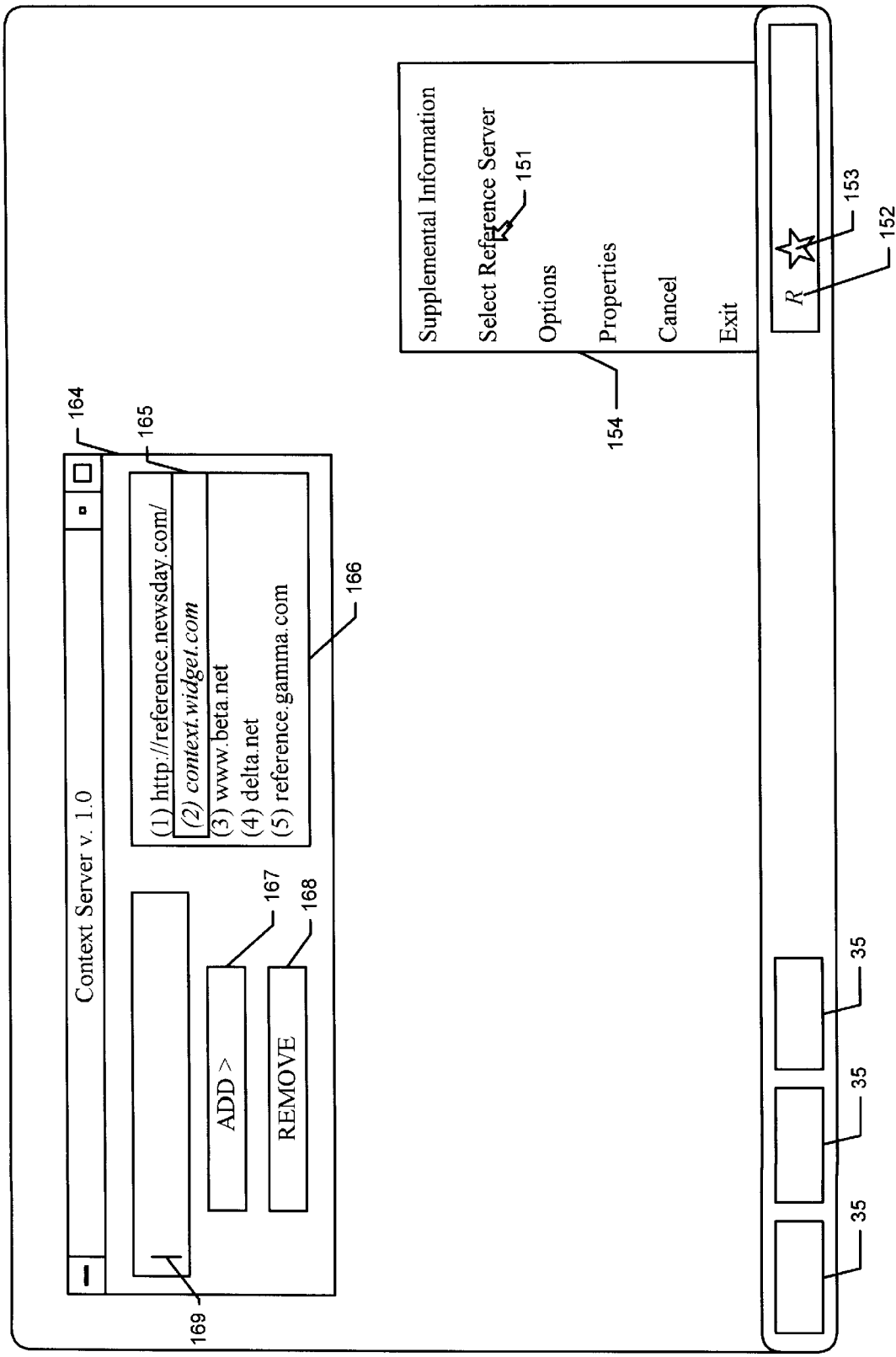

FIG. 16b is an alternate embodiment, where the user has selected the "Select Reference Server" menu item, which causes the window 164 to be displayed. Shown in window 164 are five reference servers in list box 166 that have been configured for the client computer. Reference server "reference.widget.com" is currently selected, as is indicated by the box 165 around the name of this reference server. The cursor 151 can be used to select other reference servers in the list box 166. The selected reference server can be removed from the list by selecting the "remove" button 168. Additional reference servers can be added by identifying them in the box 168, and then selecting the "add" button 167.

Figure 17A:
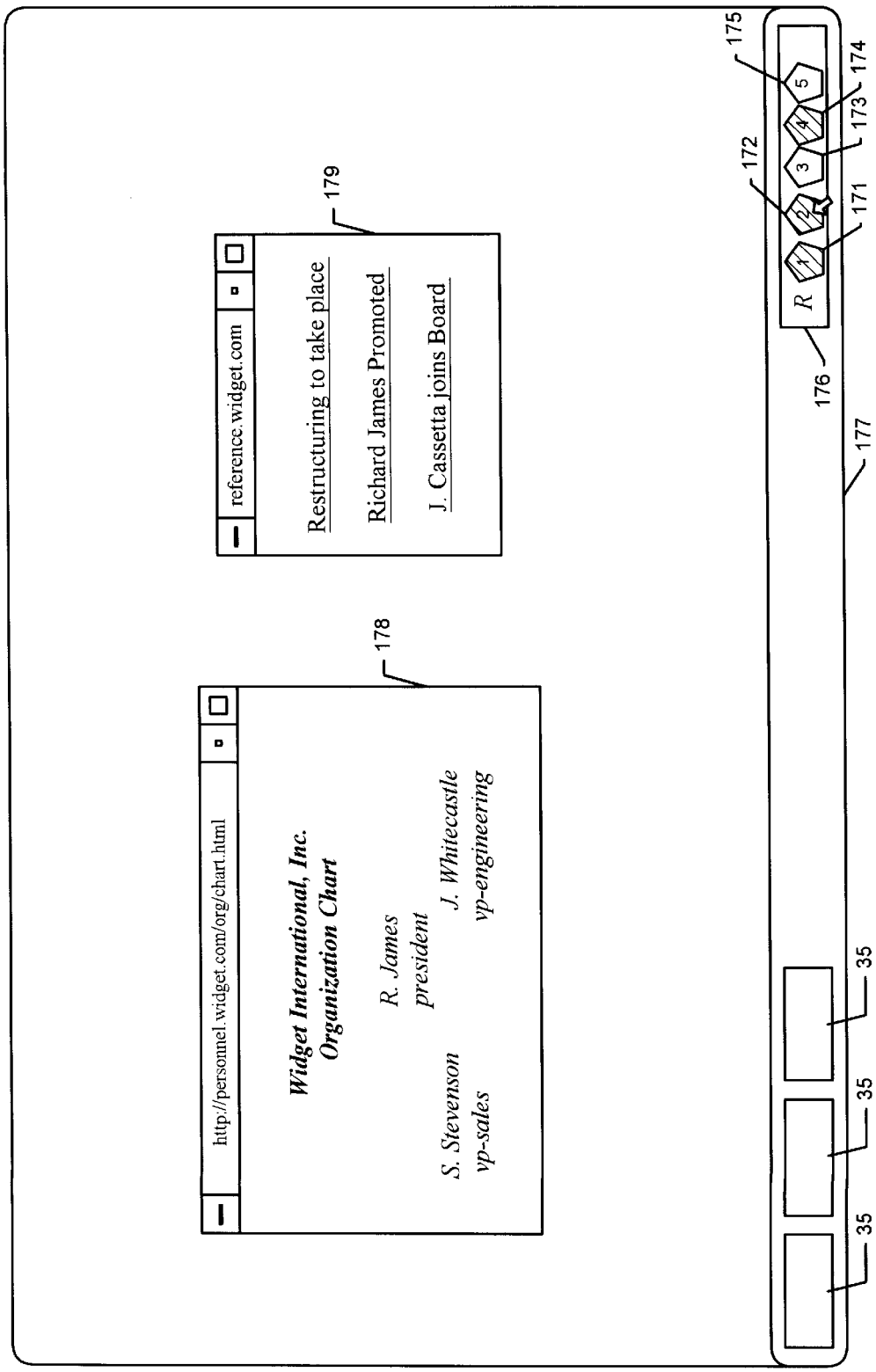

In FIG. 17a, a browser window 178 is shown on the screen. The taskbar 177 in FIG. 17a has an icon tray 176 with a display element corresponding to each of the five reference servers shown in the window 164 of FIG. 16b. In the embodiment shown, some of the display elements 171, 172, 173, 174, and 175 are shaded to indicate which reference servers have supplemental information relating to the document displayed in the browser window 178. As is indicated by the shaded display elements on the icon tray 176 in FIG. 17a, the reference servers corresponding to display elements 171, 172, and 174 have supplemental information (or links to such information) relating to the "http://personnel.widget.com/org/chart.html/" document. The user has selected display element 172 in FIG. 17a, which corresponds to the "reference.widget.com" reference server. In response to this selection, a window 179 is displayed having a list of links from the "reference.widget.com" reference server.

Figure 18A:
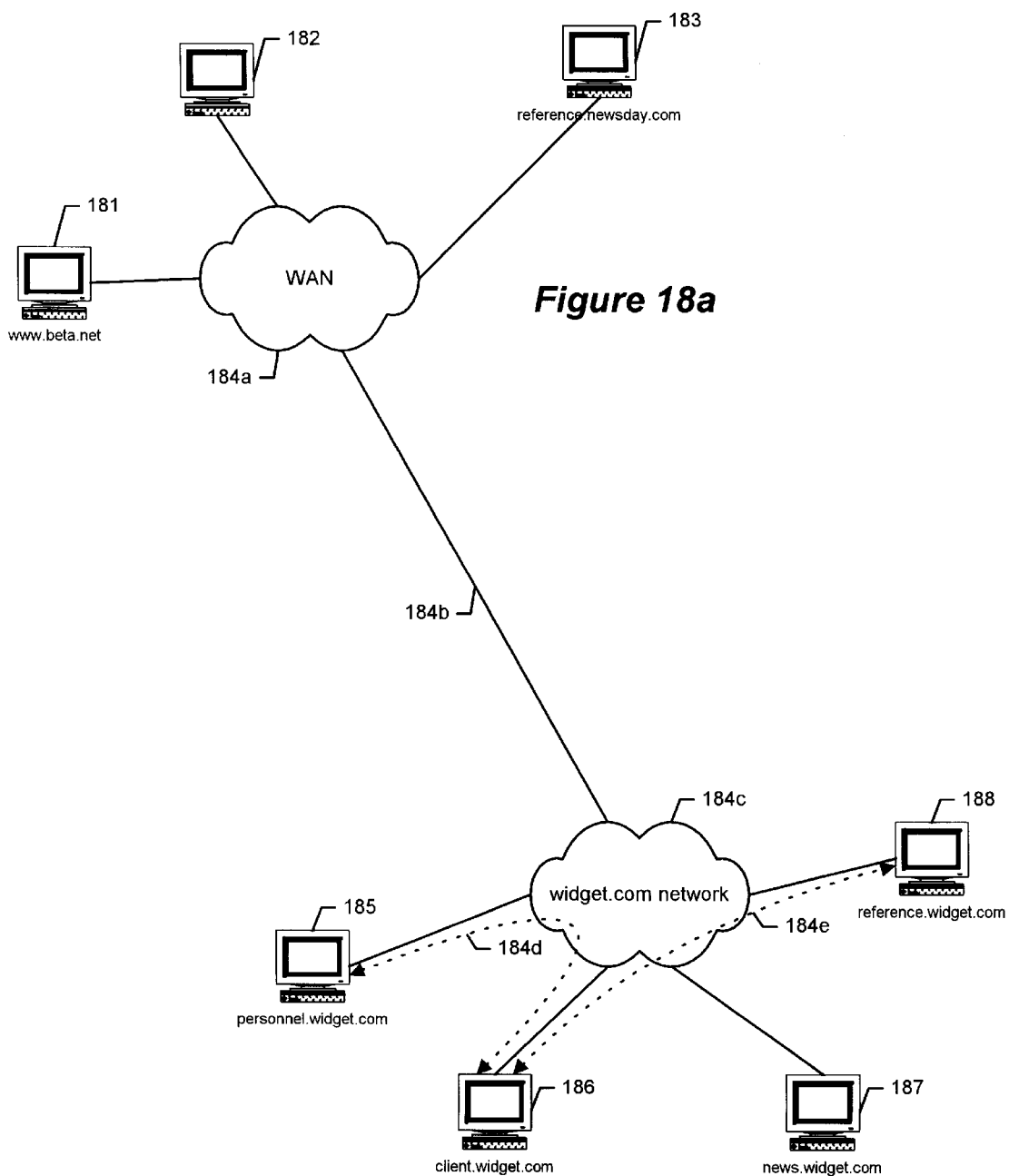

FIG. 18a is a network diagram illustrating the actions described in connection with FIG. 17a. The network 184c in FIG. 18a represents the intranet for widget.com, and each of the computers 185, 186, 187, and 188 are on that intranet. The intranet is connected by connection 184b to a wide area network 184a, which has on it computers 181, 182, and 183, and perhaps many others. The dotted line 184*d* represents the request by the client computer 186, and the retrieval by that computer from the server 185 of the "http://personnel.widget.com/org/chart.html" document. When the client computer 186 retrieves that document, it is displayed in the browser window 178 as shown in FIG. 17*a*. The client computer then seeks supplemental information about the requested document. In FIG. 17*a*, display element 172 is selected, causing the client computer 186 to initiate a request to computer 188 (reference server "reference.widget.com") for supplemental information. The computer 188 responds with the information displayed in window 179 in FIG. 17*a*. If the user then selects one of the links in window 179 in FIG. 17*a*, the client computer 186 will initiate a request for the document corresponding to the selected link to another server, which may or may not be on the widget.com network.

Figure 17B:
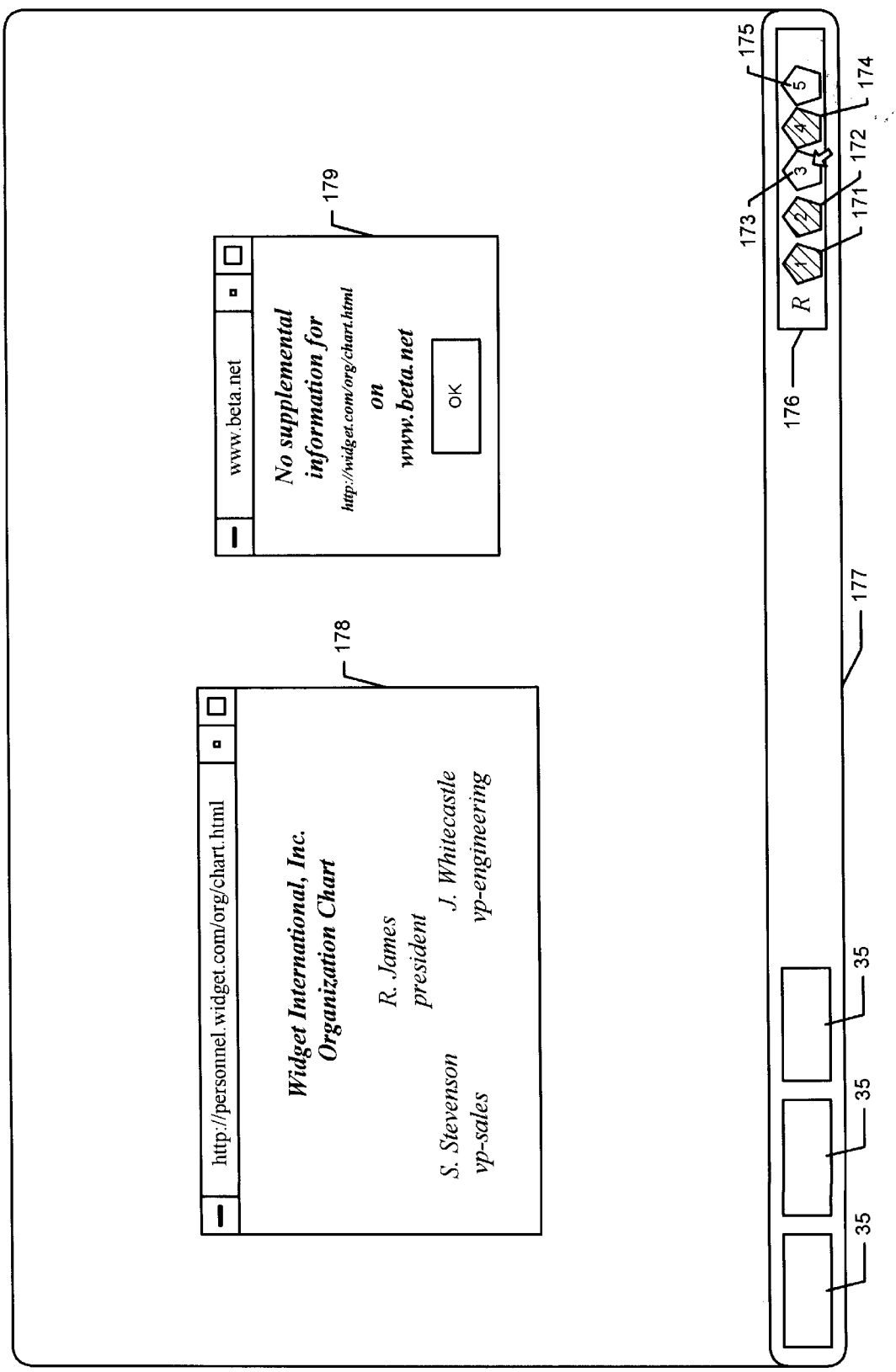
Figure 18B:
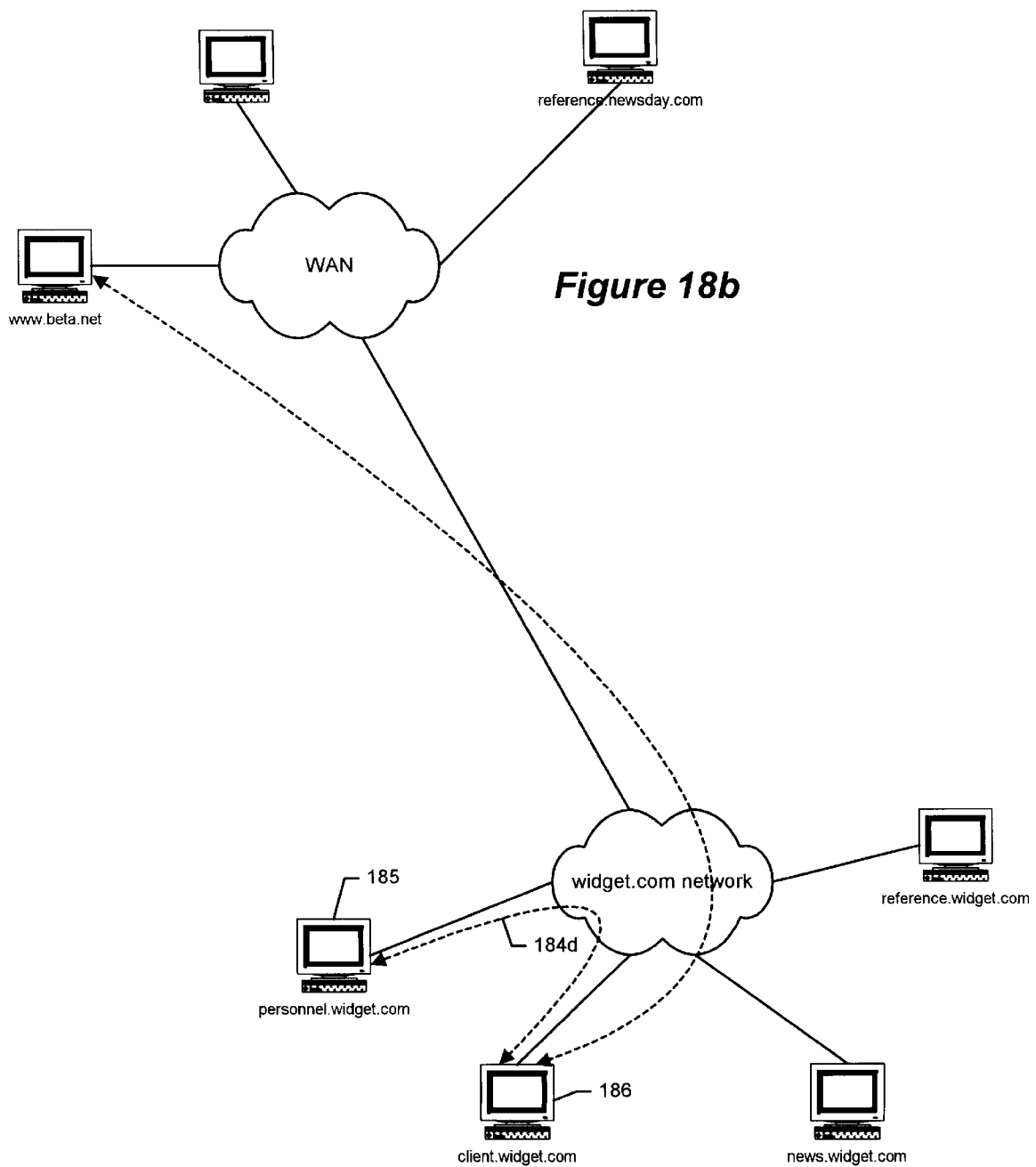

In FIG. 17*b*, when the user selects the display element 173 that corresponds to the "www.beta.net" reference server, a window 179 is displayed indicating that no supplemental information for the document displayed in the browser window 178 is available on that reference server. FIG. 18*b* is a network diagram corresponding to FIG. 17*b*. The dotted line 184*d* represents the request by the client computer 186, and the retrieval by that computer from the server 185 of the "http://personnel.widget.com/org/chart.html" document. When the client computer 186 retrieves that document, it is displayed in the browser window 178 as shown in FIG. 17*b*. The client computer then seeks supplemental information about the requested document. In FIG. 17*b*, display element 173 is selected, causing the client computer 186 to initiate a request to computer 181 (reference server "www.beta.net") for supplemental information. The computer 181 responds by indicating that no supplemental information is available for the "http://personnel.widget.com/org/chart.html" document. Information reflecting this fact is shown in the window 179 of FIG. 17*b*.

In some embodiments, where supplemental information is not available for a particular document or network resource, supplemental information relating to the particular domain or server on which that document or network resource is located could be provided. For example, if the selected reference server has no information about the document "http://personnel.widget.com/org/chart.html," then supplemental information relating to the widget.com domain could be provided, or alternatively, supplemental information about the personnel.widget.com server could be provided. In other embodiments, supplemental information relating to any network resource from the widget.com domain or from the personnel.widget.com server could be provided as supplemental information for the "http://personnel.widget.com/org/chart.html" document. Thus, while there may be no supplemental information for a particular network resource, it may be possible to provide supplemental information for a network resource from the same domain or server.

Figure 17C:
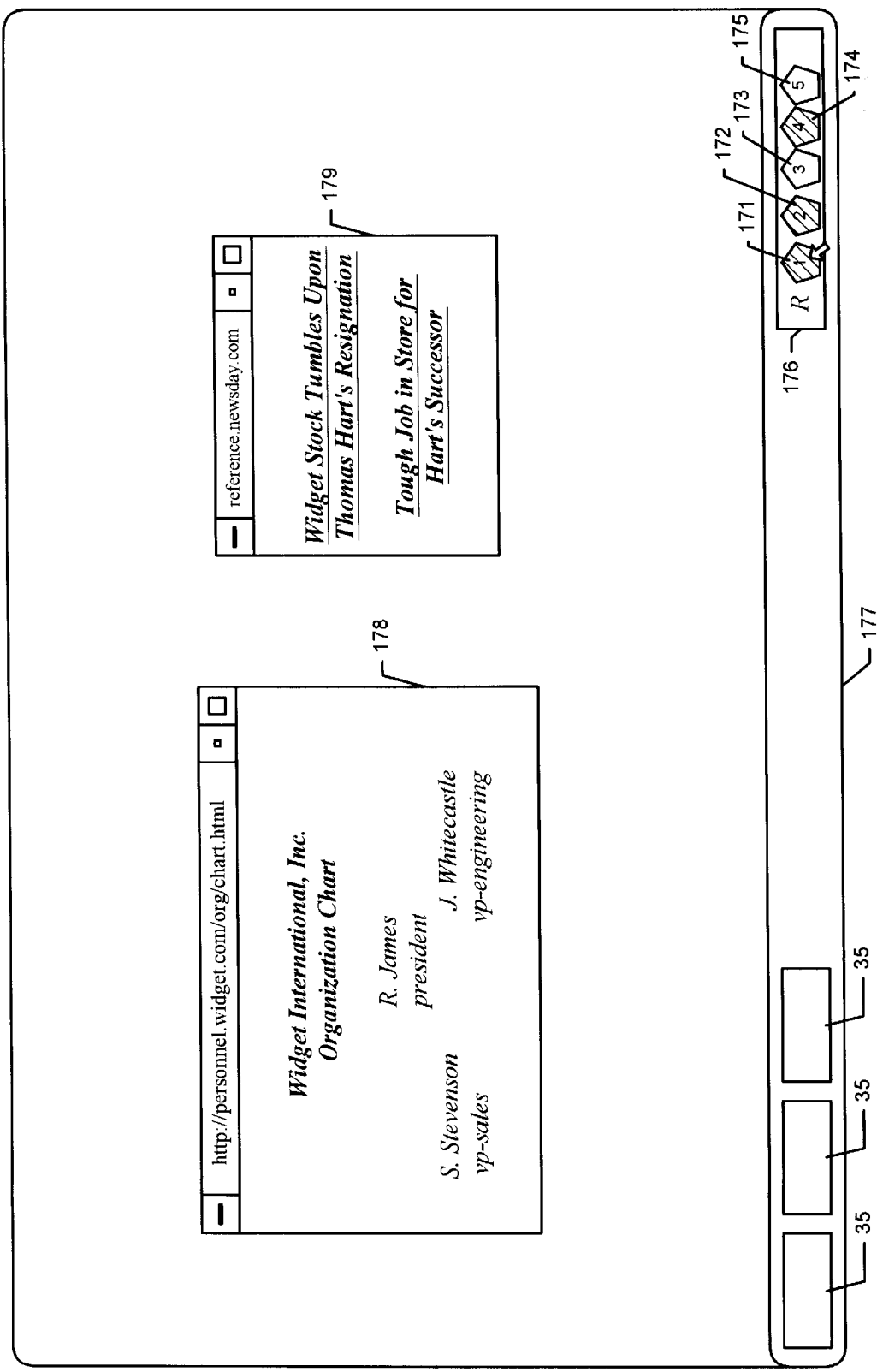
Figure 18C:
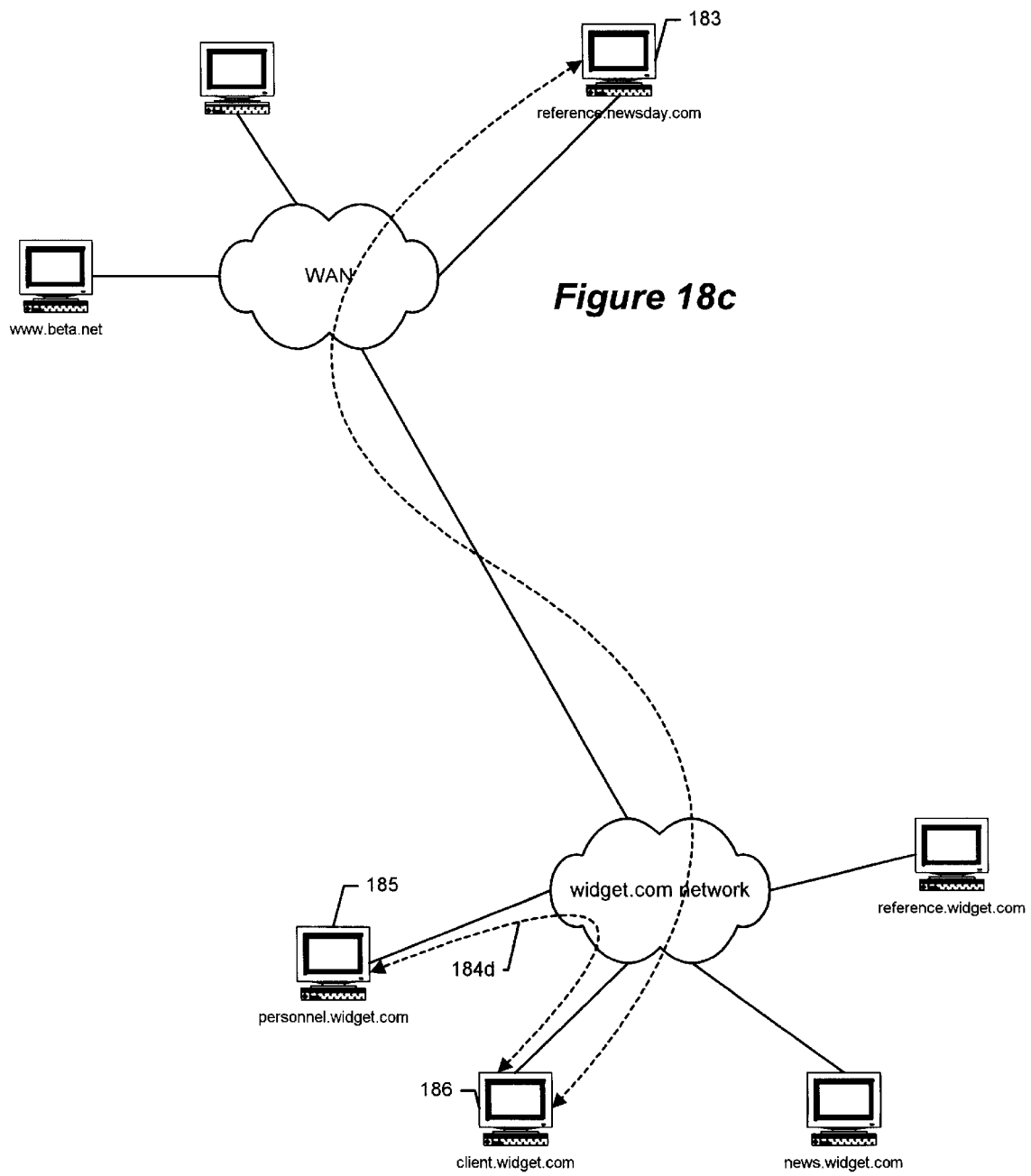

In FIG. 17*c*, the user has selected the display element 171, which corresponds to the "reference.newsday.com" reference server. In response to this selection, a window 179 is displayed having a list of links from the "reference.newsday.com" reference server. FIG. 18*c* is a network diagram corresponding to FIG. 17*c*. The dotted line 184*d* in FIG. 18*c* represents the request by the client computer 186, and the retrieval by that computer from the server 185 of the "http://personnel.widget.com/org/chart.html" document. When the client computer 186 retrieves that document, it is displayed in the browser window 178 as shown in FIG. 17*c*. The client computer then seeks supplemental information about the requested document. In FIG. 17*c*, display element 173 is selected, causing the client computer 186 to initiate a request to computer 183 (reference server "reference.newsday.com") for supplemental information. The computer 183 responds with the information displayed in window 179 in FIG. 17*c*. If the user then selects one of the links in window 179 in FIG. 17*a*, the client computer 186 will initiate a request for the document corresponding to the selected link to the server on which that document is stored. This server will likely be on the WAN network, and may be, but need not be, the reference.newsday.com server.

Although the reference server shown and described in connection with FIGS. 17 and 18 is shown as a single server, it should be understood that a reference server may encompass more than one computer, device, or system. In some implementations, it is possible for a reference server to be a distributed device, so that it spans more than one network.

Figure 19:
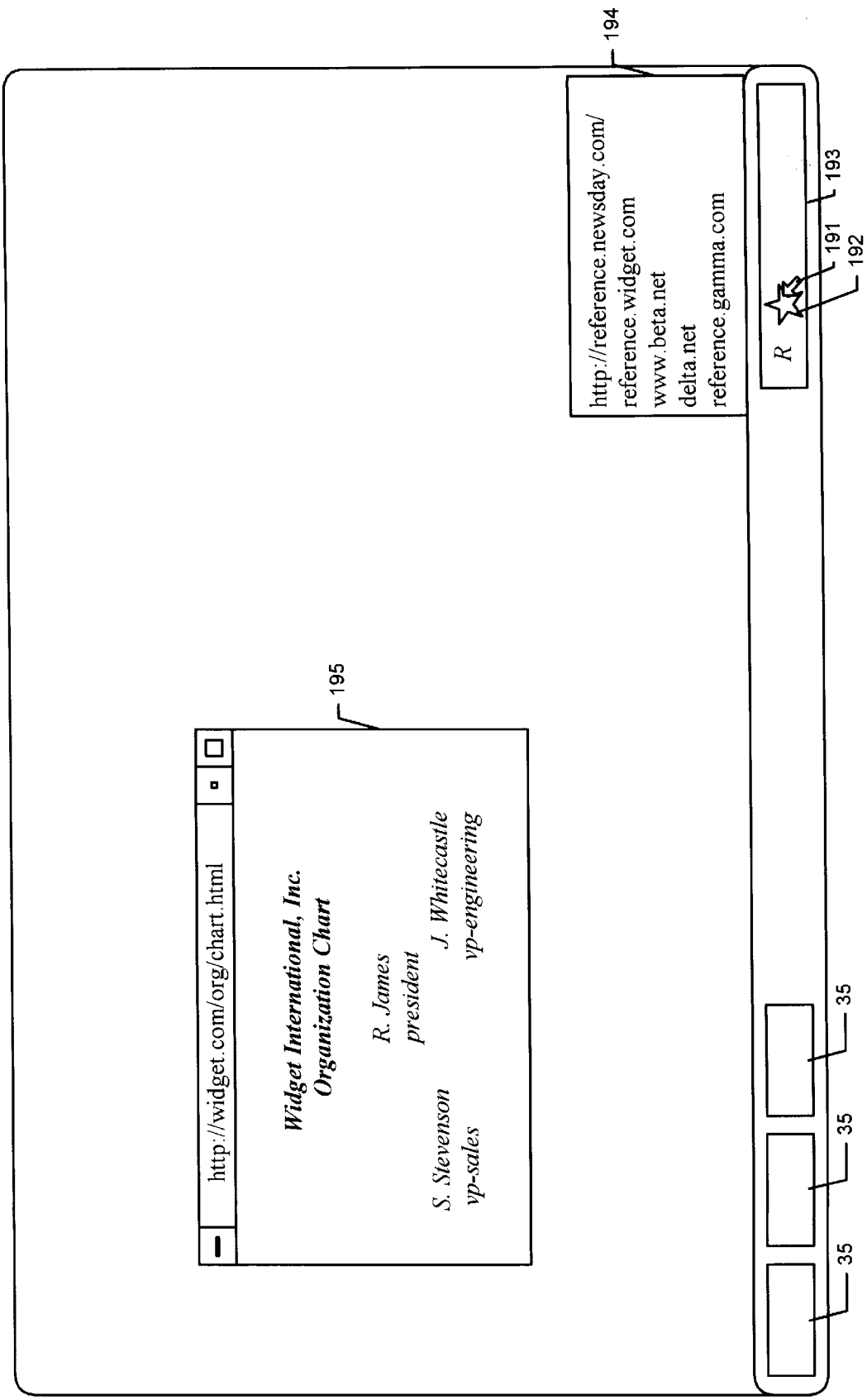

FIG. 19 illustrates an alternate embodiment where more than one reference server may be selected by the user. In FIG. 19, the user has selected the display element 192 with the cursor 191, which causes the menu 194 to be displayed. This menu allows the user to select the desired reference server. The reference servers on the menu 194 could be ordered in a number of different ways. For example, the reference servers could be listed alphabetically, or by order of most recently used, or by order of most recently added to the list of reference servers. This list could also be ordered by taking into account which of the reference servers has supplemental information relating to the document displayed in the browser window 195. Those that have supplemental information might be displayed at the top of the menu, while those that do not have supplemental information could be displayed at the bottom of the menu, or perhaps omitted. Where more than one reference server has supplemental information, those that have the most supplemental information might be placed higher on the menu than those that have less. Alternatively, the menu selection items may be highlighted to indicate which has the most supplemental information, or additional information could be provided on the menu to communicate this or other information to the user.

Figure 20:
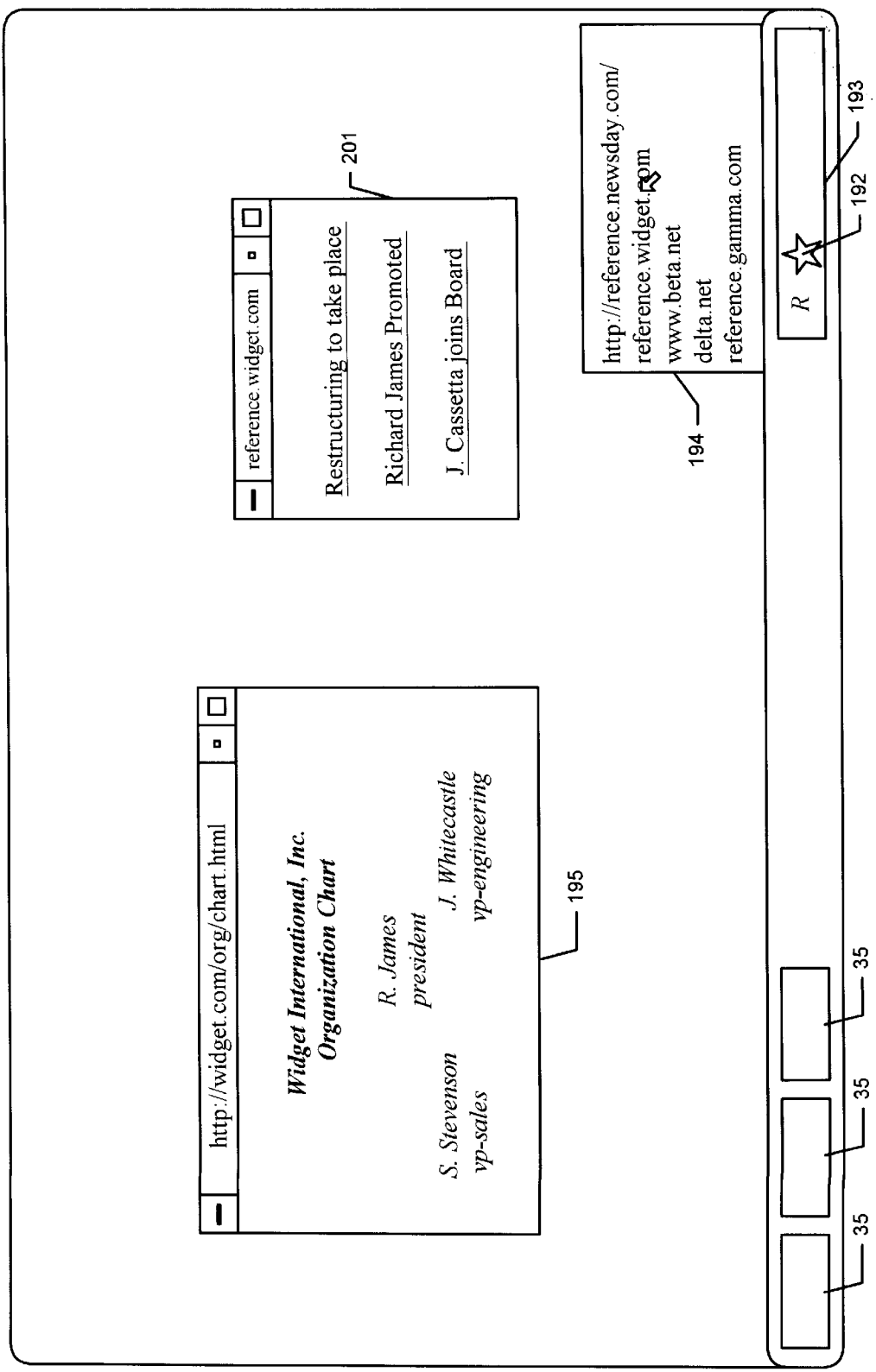
Figure 21:
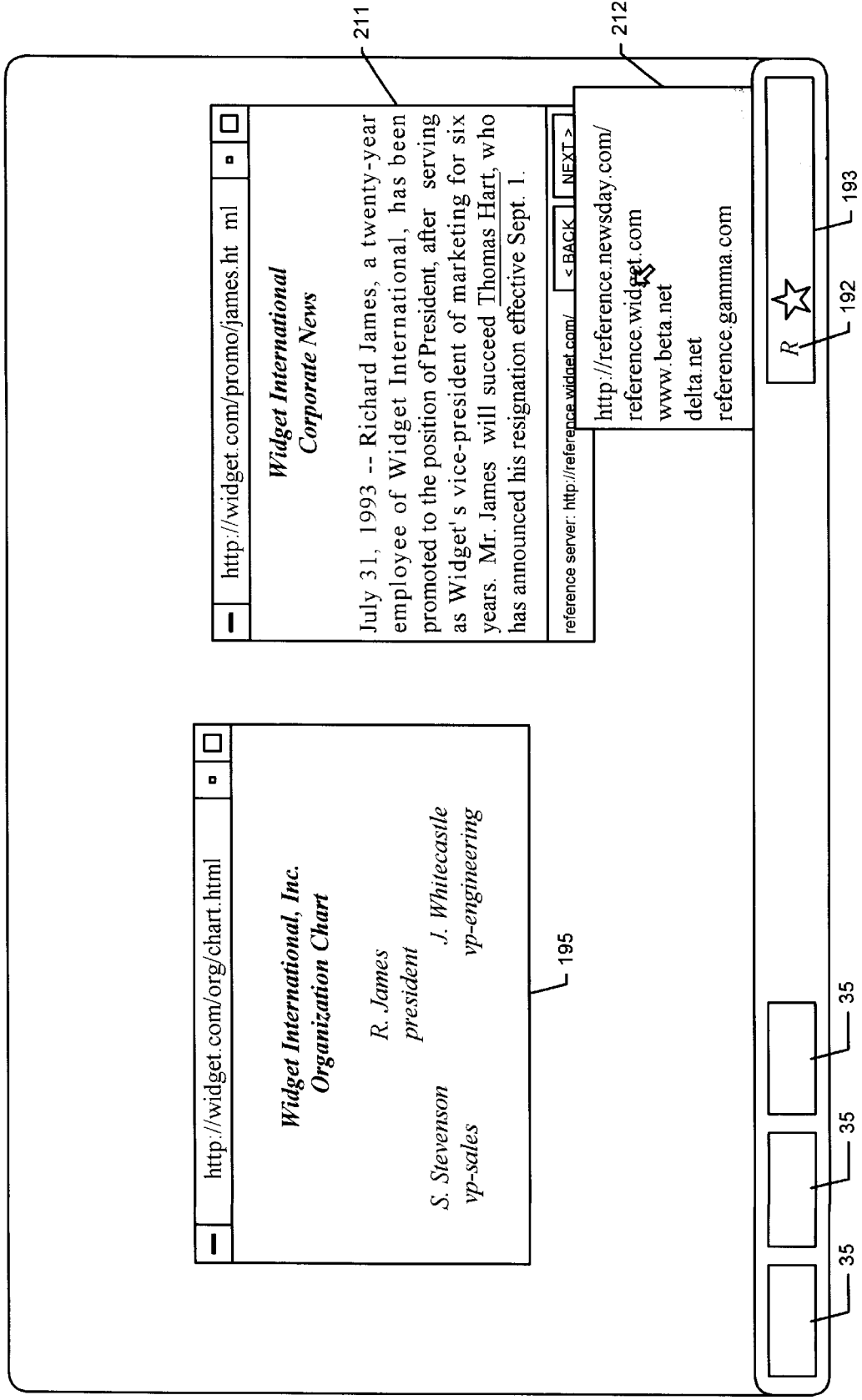

In FIG. 20, the user has selected the "reference.widget.com" reference server. The window 201 is displayed in response to this selection, providing the user with links to supplemental information. FIG. 21 illustrates an alternate embodiment where the user has selected the same reference server, and supplemental information is provided to the user without first providing links to supplemental information.

Figure 22:
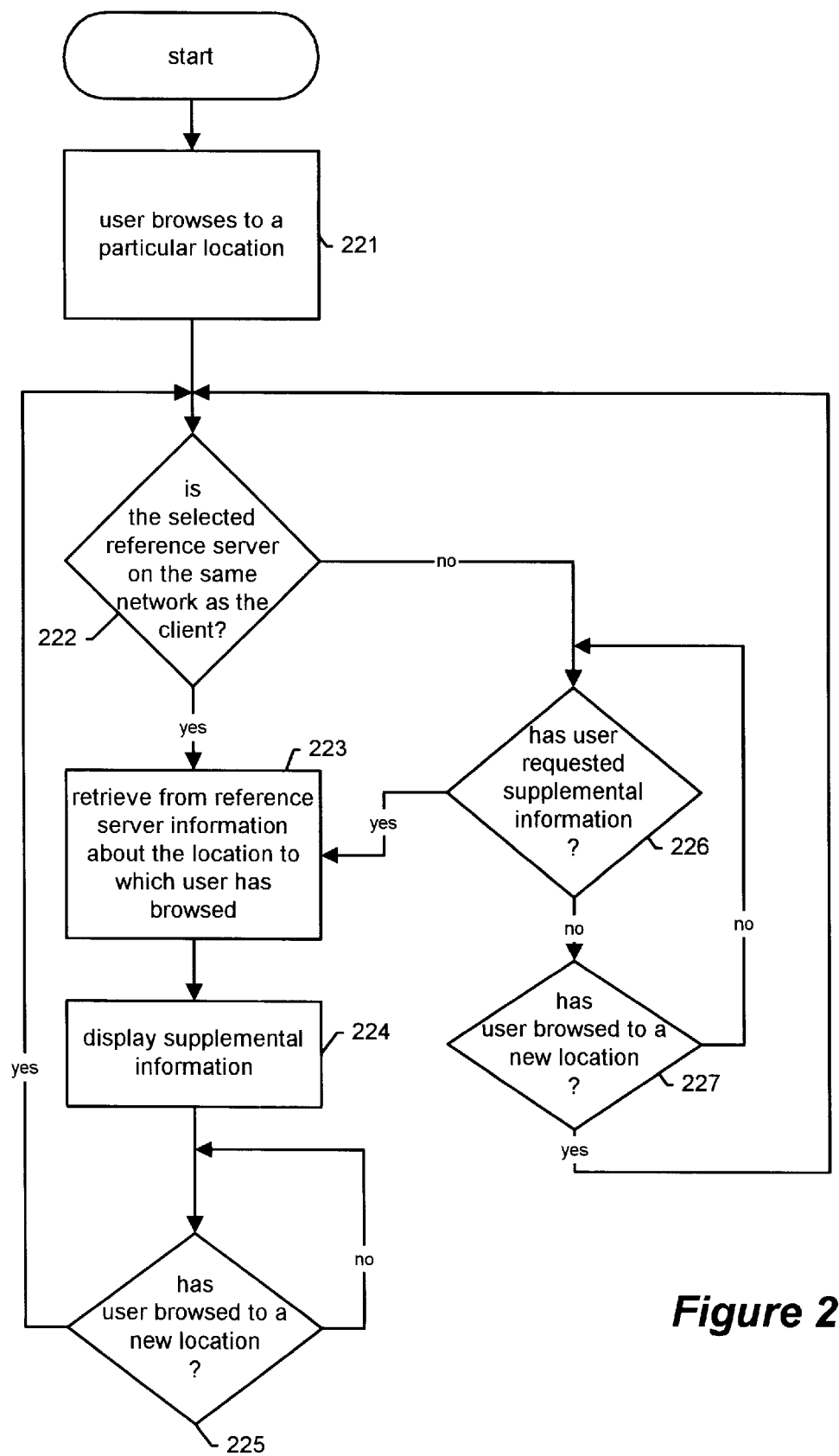

FIG. 22 illustrates a process whereby the client computer's operation depends in some way on the location of the reference server. At 221, the user browses to a particular document or other resource on the network. At 222, the client computer determines if the selected reference server is on the same network as the client computer. For example, if the client computer and the reference server are both on the same local area network, then the reference server will be on the same network as the client computer. If the condition at 222 evaluates to a "yes," then the client computer retrieves from the reference server at 223 supplemental information about the network resource to which the user has browsed. This supplemental information is then displayed or otherwise presented at the client computer at 224. The client then waits at 225 until the user browses to a new location.

If the condition at 222 evaluates to a "no," then the client computer waits at 226 until the user requests supplemental information, or until the user browses to a new location at 227. When the user requests supplemental information, it is retrieved from the reference server at 223 and displayed at 224.

Thus, in the process of FIG. 22, the client computer automatically retrieves supplemental information from the reference server when the reference server and the client computer are on the same network. However, when the client and the reference server are on different networks, the client only retrieves supplemental information when the user requests it. Such a process may be useful where a local area network has sufficient capacity and/or bandwidth to accommodate continual requests to a reference server, but where the wide area network does not. When a new request to the reference server is made each time the user browses to a new location, this may potentially overburden the network or the reference server.

Figure 23:
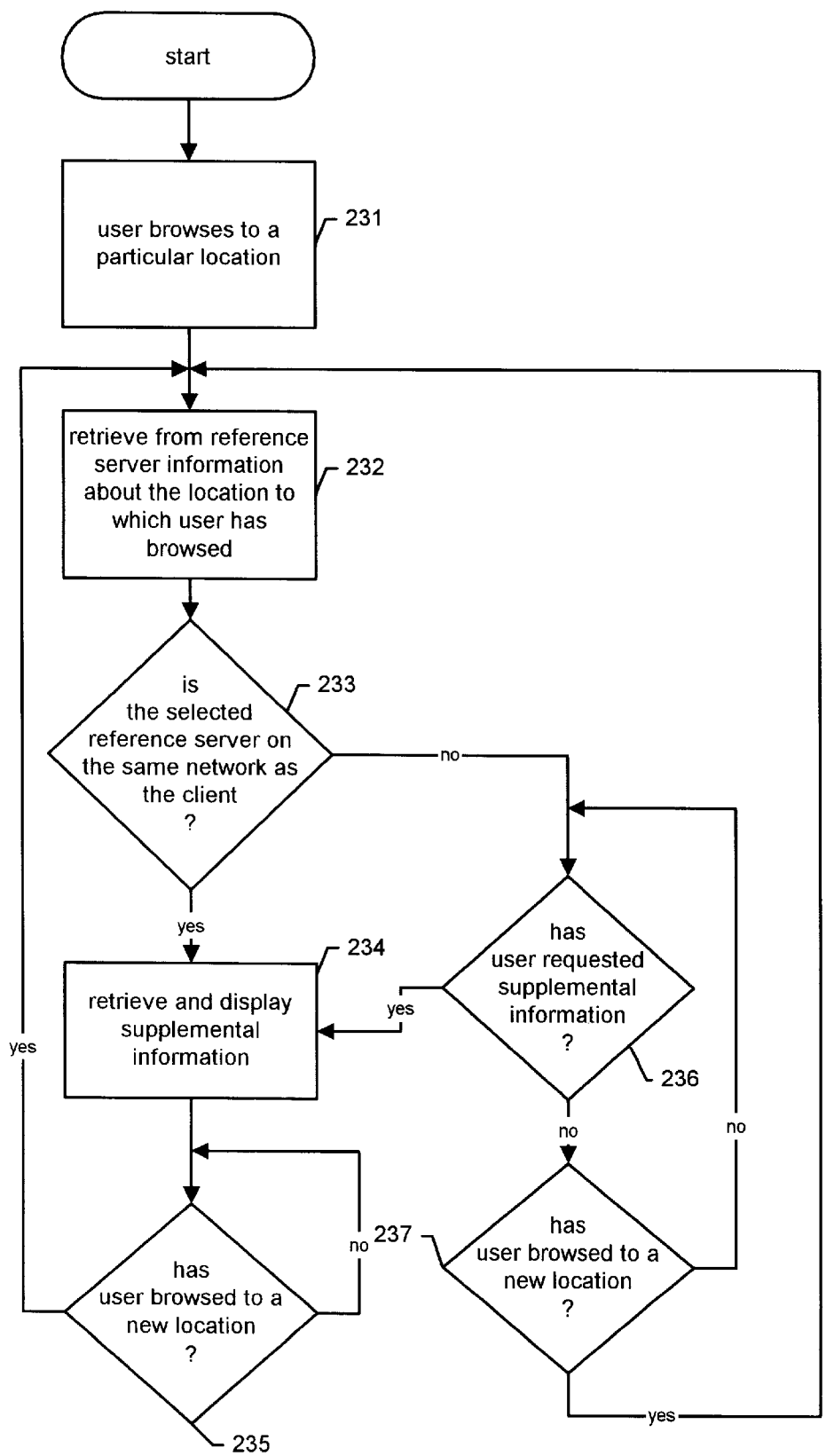

FIG. 23 illustrates another embodiment of a process whereby the client computer's operation depends in some way on the location of the reference server. In this embodiment, some information is retrieved from the reference server each time the user browses to a new location, but additional information is automatically retrieved when the client computer and the reference server are on the same network. At 231, the user browses to a particular location on the network. At 232, the client computer retrieves from the reference server information about the location to which the user has browsed. This information can take a variety of forms, including a list of the links to supplemental information that the selected reference server provides, or simply an indication of whether supplemental information is available from this particular reference server. At 233, the client determines whether the selected reference server is on the same network as the client computer. If so, supplemental information is retrieved and presented to the user at 234. The process begins again when the user browses to a new location at 235. If the condition at 233 evaluates to a "no," then the client computer waits until the user requests supplemental information before any remaining supplemental information is retrieved and presented to the user.

In FIGS. 22 and 23, the client computer automatically retrieves at least some supplemental information from the reference server when the reference server and the client computer are on the same network. In an alternate embodiment, however, it may be useful to automatically retrieve supplemental information from the reference server when the reference server is on a different network, and retrieve supplemental information when the reference server is on the same network only when the user requests it.

Figure 24:
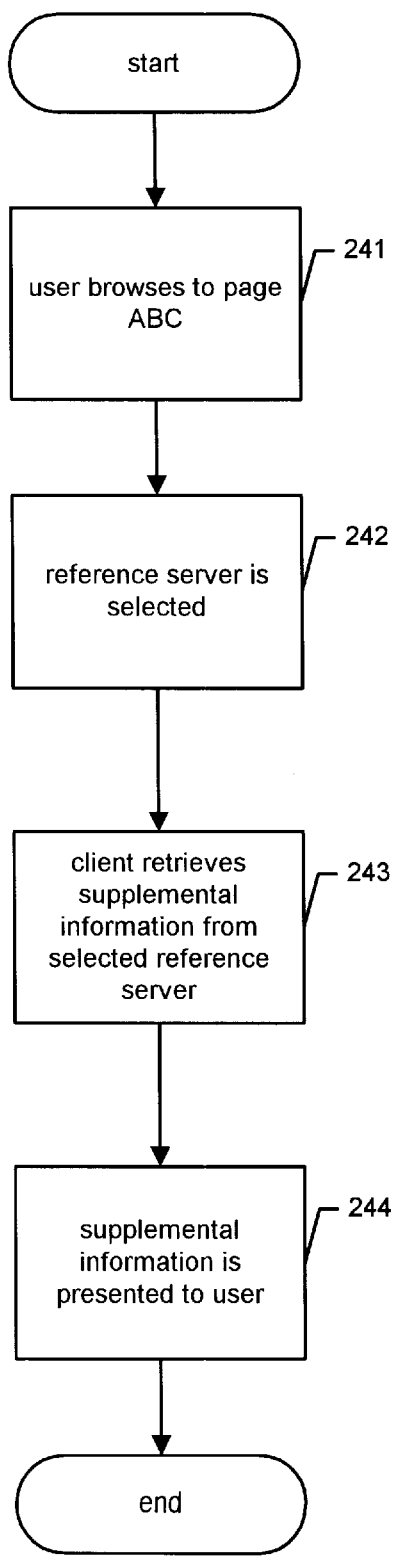
Figure 25A:
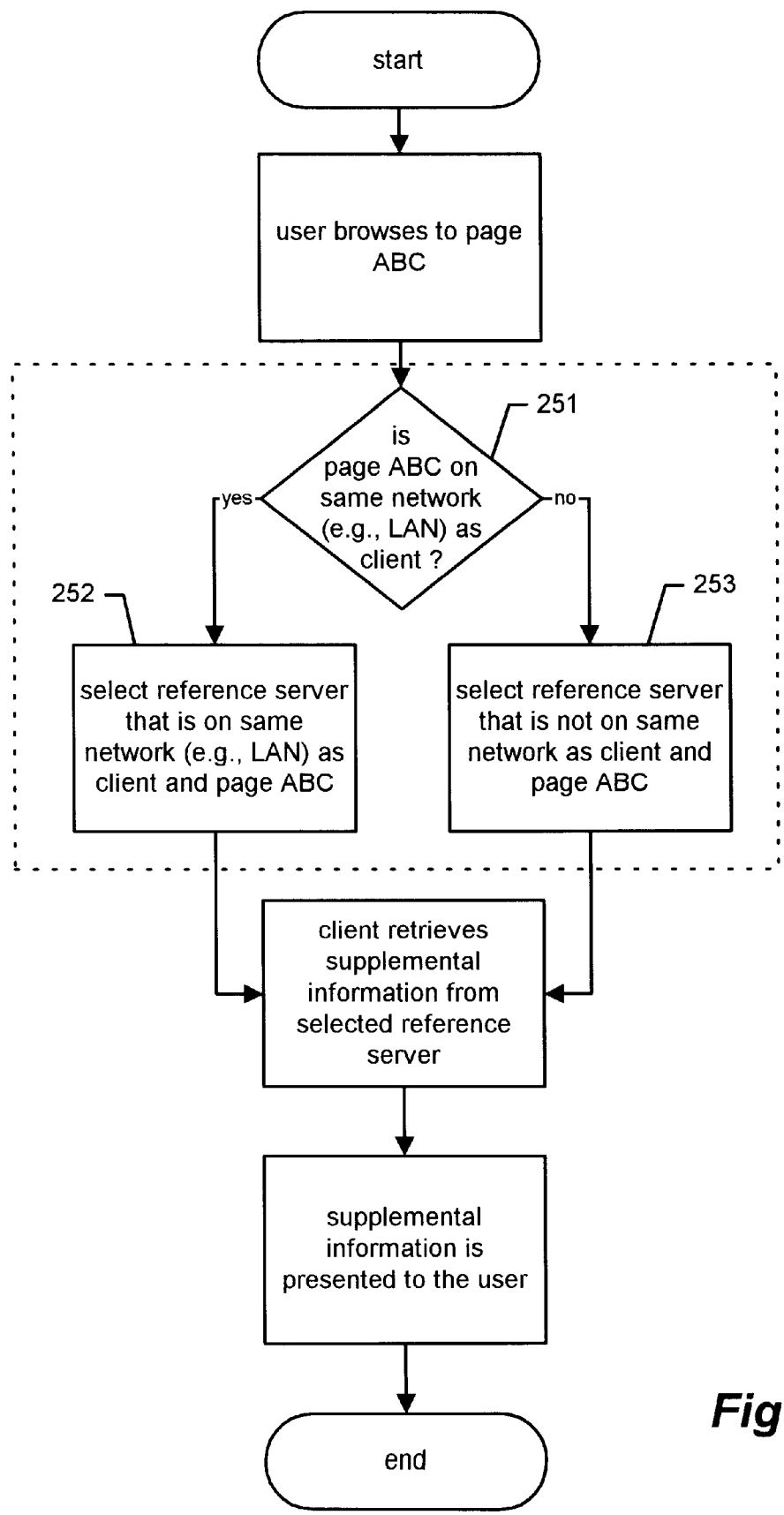
Figure 25B:
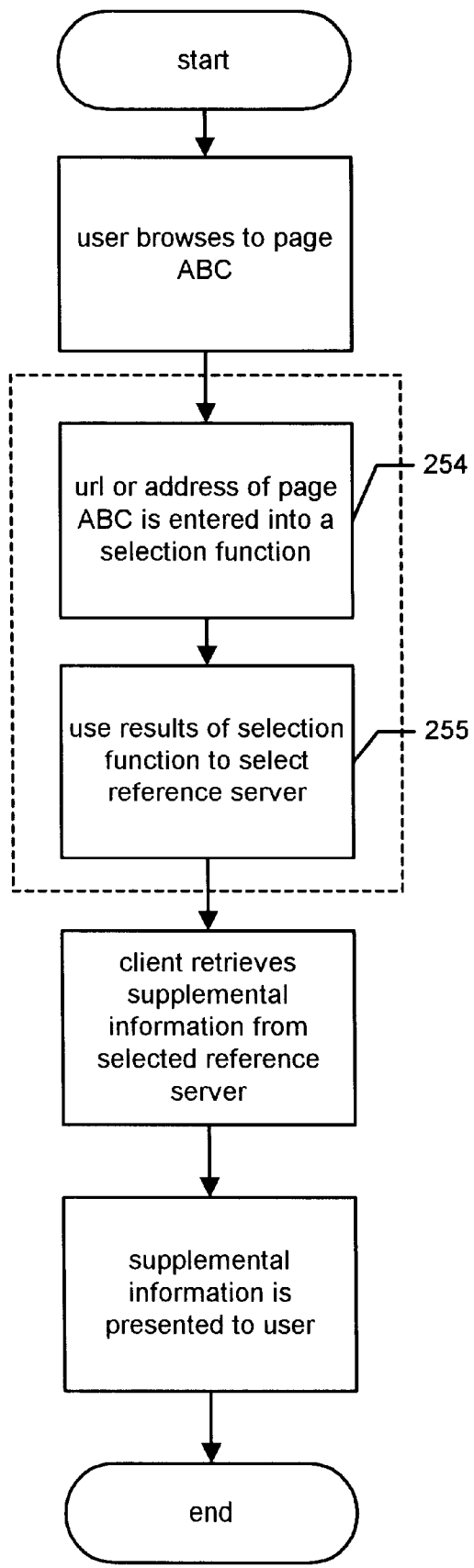
Figure 25C:
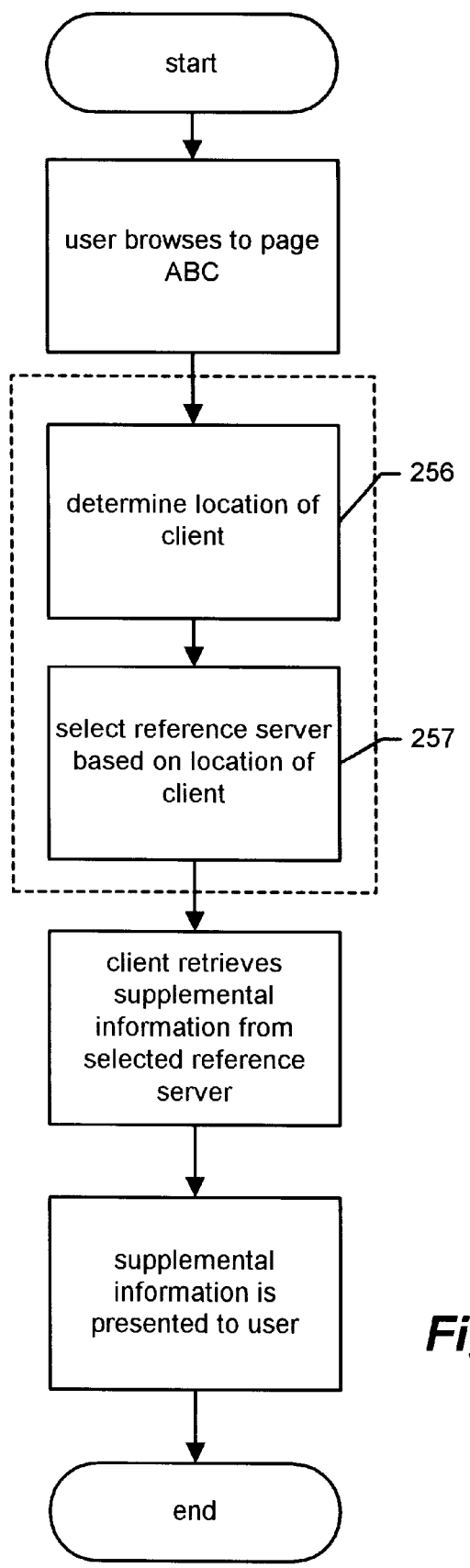

FIG. 24 illustrates a process where the client computer automatically selects at least one of a number of available reference servers. At 241, the user browses to a particular location on the network, e.g., "page ABC." At 242, a reference server is selected by the client computer, and the client computer then retrieves supplemental information from the selected reference server at 243, and this information is then displayed or otherwise presented to the user at 244. FIGS. 25a, 25b, and 25c illustrate three ways in which the selection act at 242 in FIG. 24 could be carried out. The methods illustrated are meant to be examples and it should be understood that the methods illustrated in FIGS. 25a, 25b, and 25c are not exhaustive.

In FIG. 25a, the client computer determines at 251 whether page ABC is on the same network as the client computer. If it is, then the client computer selects at 252 a reference server that is on the same network as both the client computer and page ABC. For example, where the client computer browses to a page on a corporate intranet, a reference server on that corporate intranet is chosen. This choice may be preferred because reference servers outside a corporate intranet may not, for security reasons, have any information about a page on the corporate intranet.

If it is determined at 251 that the client computer and the server from which page ABC is taken are on different networks, then the client selects at 253 a reference server that is not on the same network as the client computer. This choice may also be advantageous because if the user browses to a page that is taken from a server outside of, for example, a corporate intranet, the user may wish to see supplemental information gathered by an external reference server.

In FIG. 25b, the client computer uses the URL or address of page ABC to select a reference server by entering the URL or address into a selection function 254, which uses the characteristics of the URL to determine a proper reference server. For example, some reference servers may be particularly useful for network resources or documents taken from particular servers, and in such a situation, the client computer can select a reference server based on the server from which page ABC was taken. The client computer may select one reference server for pages taken from some domains, and another reference server for pages taken from another set of domains. Alternatively, it may be possible to have a reference server for each letter of the alphabet, and for pages taken from a domain starting (or ending, or resulting from a hash function, etc.) with a particular letter, the client computer seeks supplemental information from the reference server for that particular letter. Where the number of reference servers is large, the number of requests to each reference server will normally decrease, thereby reducing the load on each reference server.

In FIG. 25c, the client determines its location at 256, and selects a reference server based on its location. For example, a client computer in the Midwestern part of the country may use a reference server in that same part of the country, whereas a client computer that accesses a network in the southern part of the country may access a reference server in that location. If reference servers are distributed throughout a wide area or even local area network, it may be possible using such a technique to reduce network traffic, or at least reduce network traffic that ultimately spans long distances. Similarly, the client computer could select a reference server based on the network to which it is attached. As an example, a corporate intranet may be made up of a number of networks, each network having its own reference server. It may be preferred to have each client access the reference server on its own network, rather than on another network in the intranet. This would reduce traffic between the networks in such an intranet.

Figure 26:
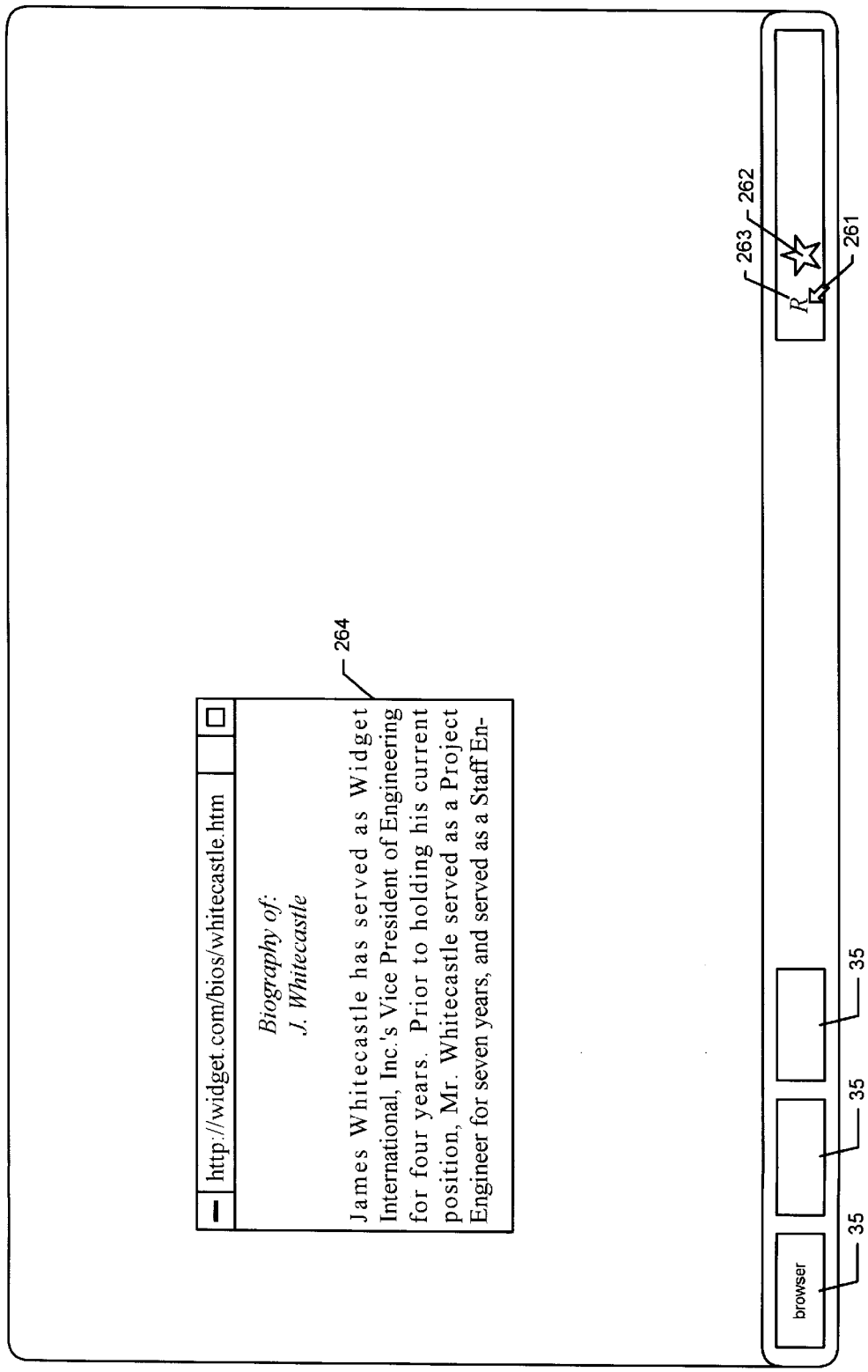

In FIG. 26, the user has browsed to the page on the network displayed in window 264, and is selecting the display element 263 with the cursor 261. The user selects the display element 263 when the user wishes to "register" a page, document, or other network resource at another page, document, or network resource. Registering a page effectively makes the registered page supplemental information for another page on the network, for a given reference server. The process of registration involves informing a particular reference server of which network resources are to be considered supplemental information for other network resources.

Figure 27:
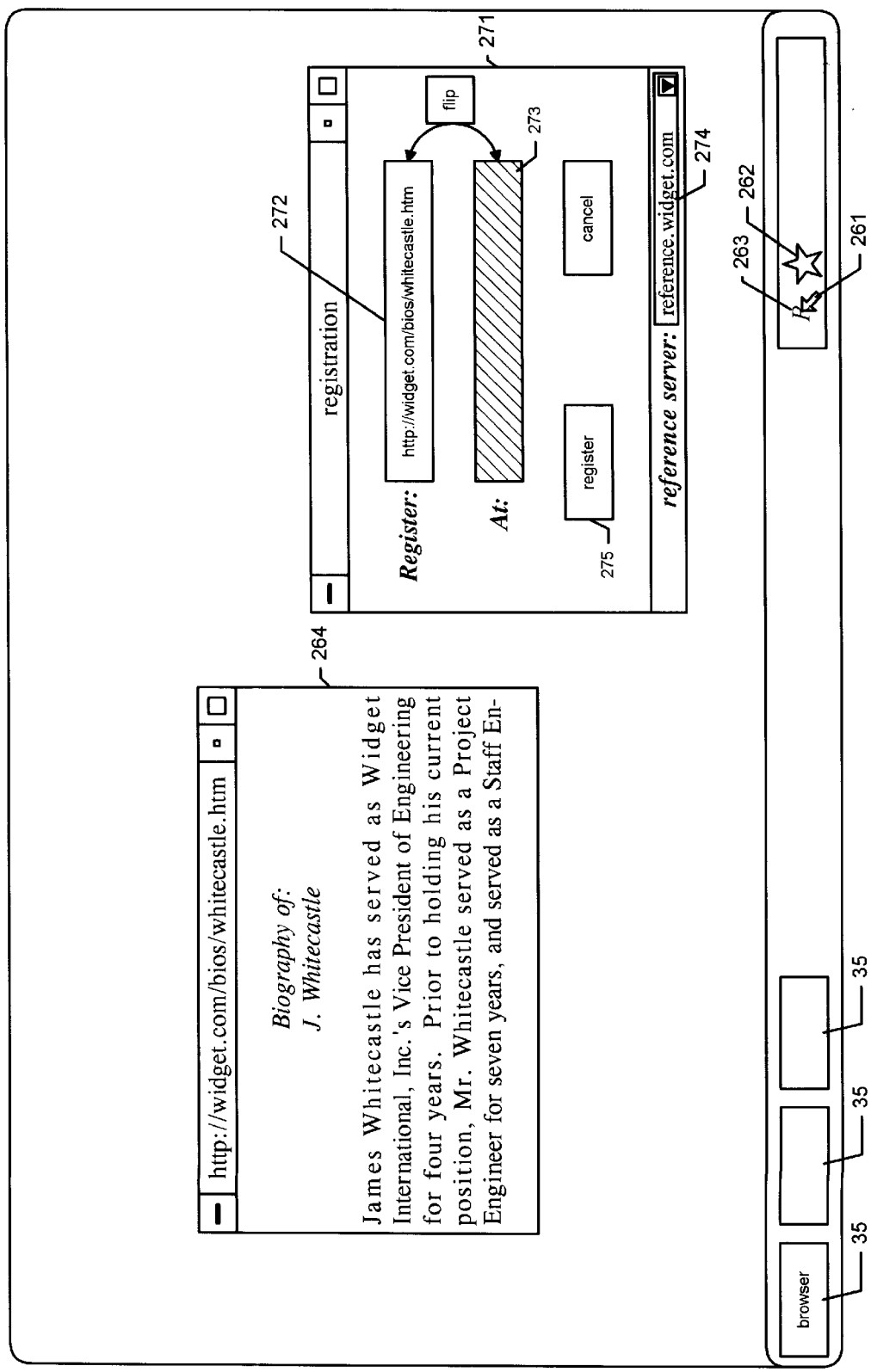

Upon selection of the display element 263 in FIG. 26, the display is updated to that shown in FIG. 27. The window 271 helps the user through the registration process, and provides information about the progress of the registration. The URL of the document or page displayed in the browser window 264 is automatically placed in the edit box 272 in FIG. 27. The edit box 272 holds the registering URL, which identifies network resource (or document) that is to become supplemental information for some other network resource (or document). The edit box 273 is for holding the base URL, which identifies the document that will have the newly registered supplemental information. The edit box 273 is shaded to indicate that no base URL has yet been entered.

Figure 28:
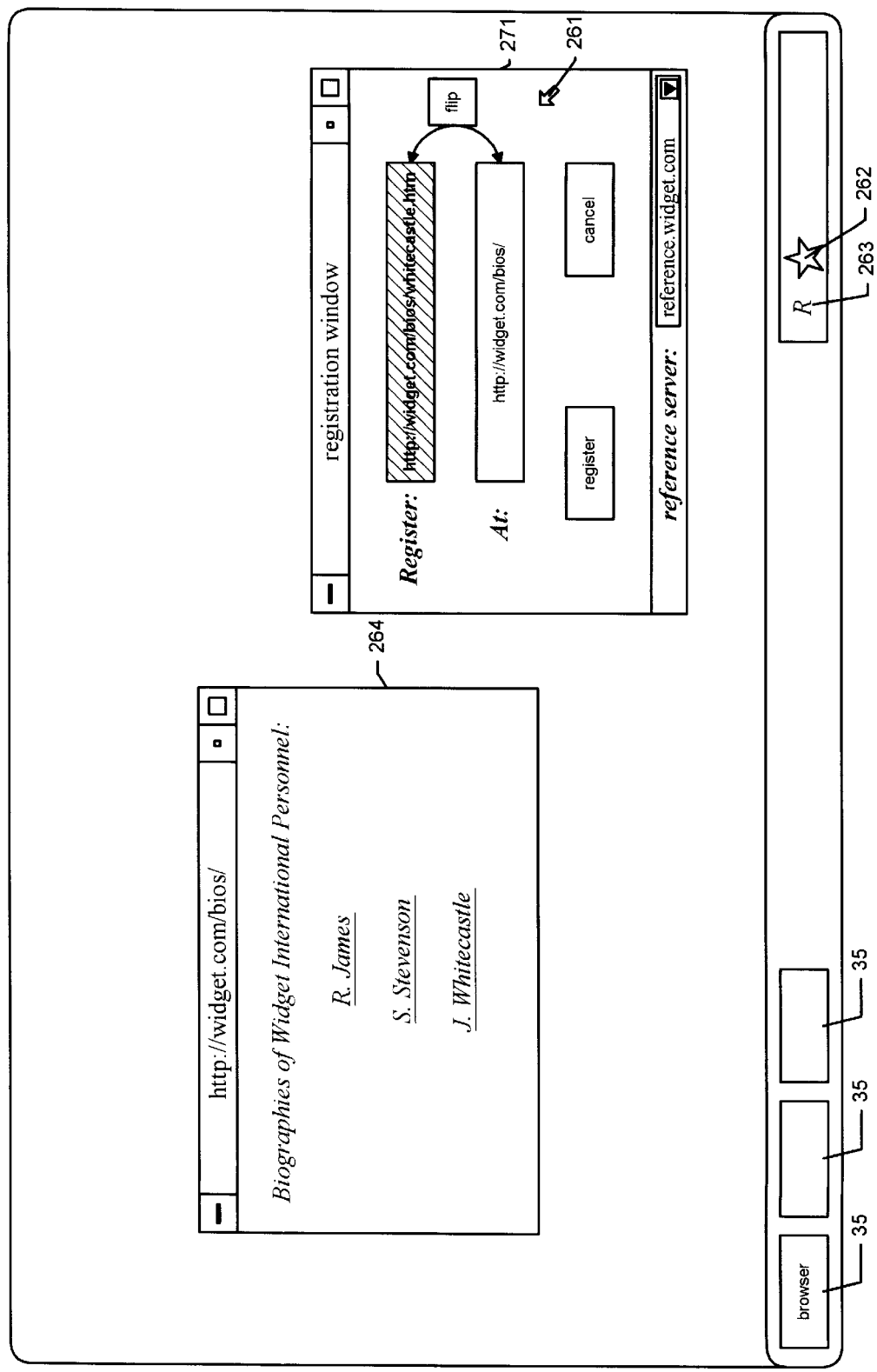

When the user browses to a new page, as shown in FIG. 28, the URL of the new page in the browser window 264 is automatically entered into the edit box 273 in window 271. The edit box 272 has been shaded, but the registering URL from the window 264 in FIG. 27 still remains in the edit box 272.

Figure 29:
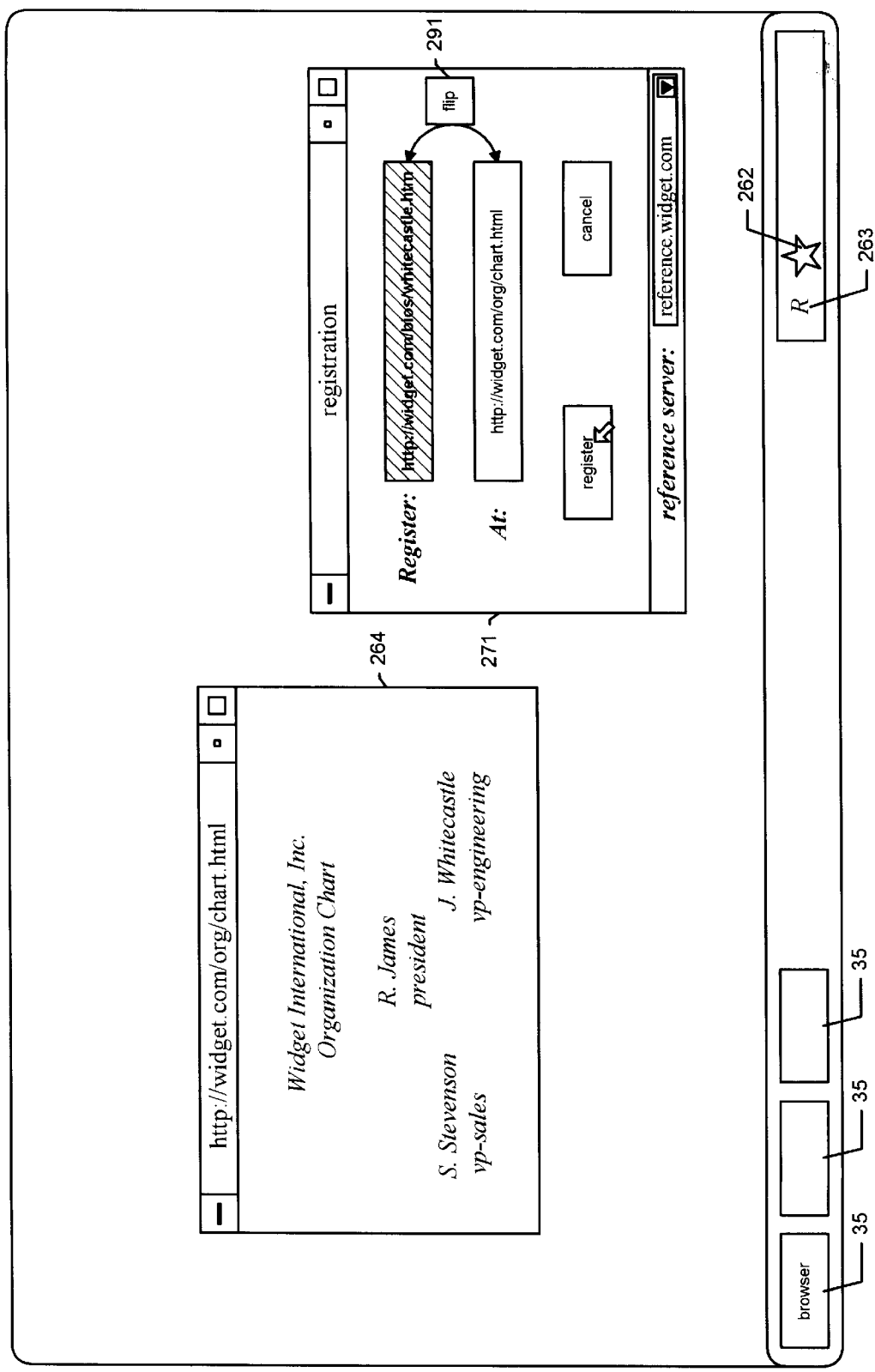

In FIG. 29, the user has browsed to yet another page, and the edit box 273 is updated to hold the URL of the document displayed in window 264 in FIG. 29. When the user selects the "register" button 275 as shown in FIG. 29, the actual registration takes place. This means that the URL "http://widget.com/bios/whitecastle.htm" (box 272) is registered at the URL "http://widget.com/org/chart" (box 273) on the reference server "reference.widget.com," as identified by the box 274. In other words, after the user selects the "register" button 275, any client computer that requests supplemental information relating to the URL "http://widget.com/org/chart.html" from the reference.widget.com reference server will be notified that the document "http://widget.com/bios/whitecastle.htm" is supplemental information. This normally will occur when the user has the URL "http://widget.com/org/chart.html" loaded in his or her browser, and the user requests supplemental information form the reference.widget.com. There may be other instances of supplemental information for that same document, but the "http://widget.com/bios/whitecastle.htm" document will be one instance of supplemental information identified by the reference.widget.com reference server.

Thus, as illustrated in FIGS. 26 to 29, the user browses to a particular page that he or she wishes to register at some other page, and then selects the registration display element 263. The user then browses to the page at which he or she wishes to register the prior page, and then selects the registration button 275. In other embodiments, the order can be reversed such that the base URL is selected first, followed by the URL that is to be registered as supplemental information. In other embodiments, more than one browser window could be displayed so that the documents corresponding to the base URL and the registering URL are displayed at the same time.

Figure 30:
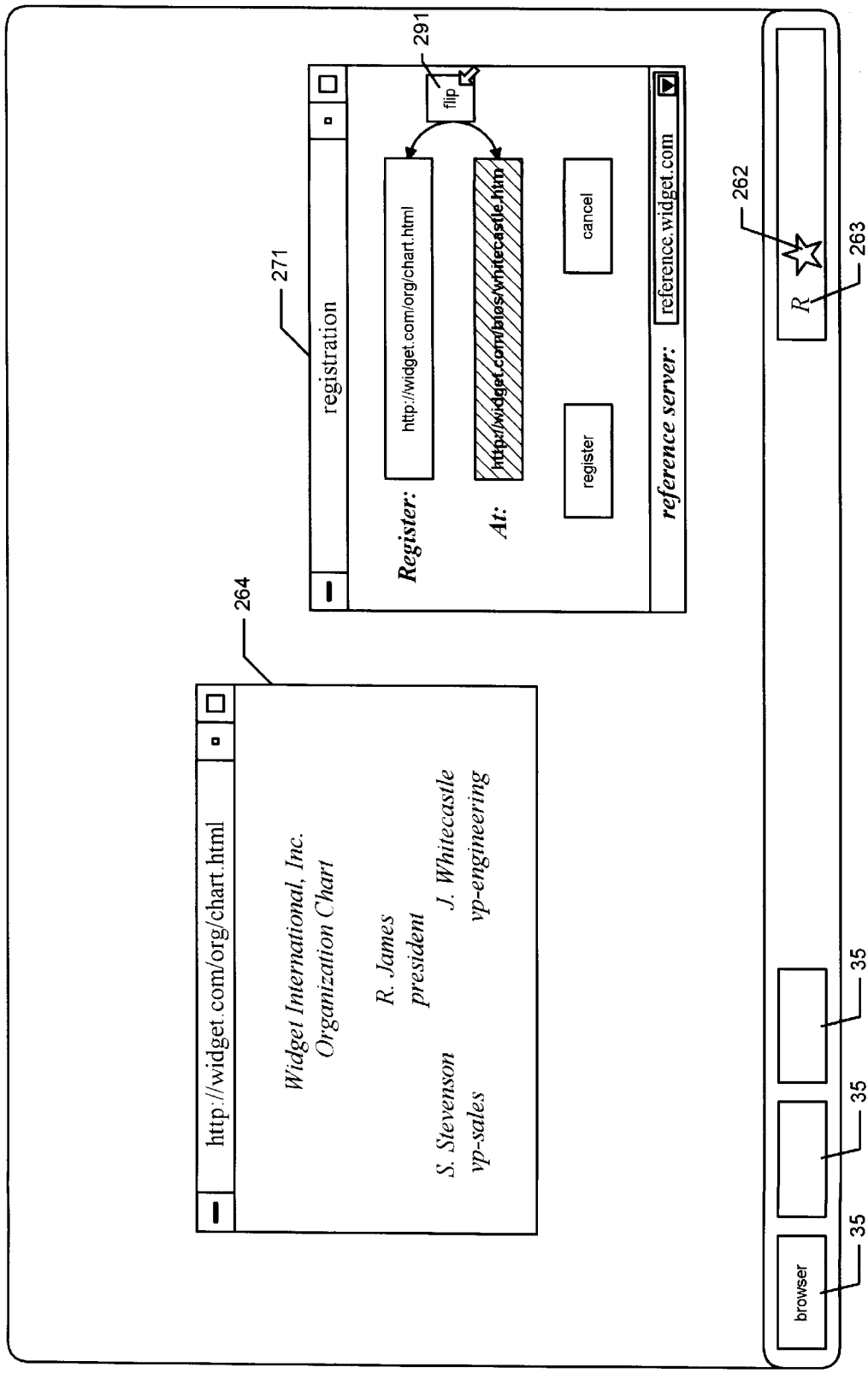

Referring again to FIG. 29, the user may decide that he or she has chosen the URLs in boxes 272 and 273 in the wrong order, and may wish to register the URL shown in edit box 273 at the URL shown in edit box 272. In this situation, the user may select the flip button 291 as shown in FIG. 30, thereby switching the contents of boxes 272 and 273 to that shown in FIG. 30. The user may continue to browse to different locations with the browser 264, and the new URLs to which the user browses will be placed in edit box 272, rather than the now shaded 273.

Figure 31:
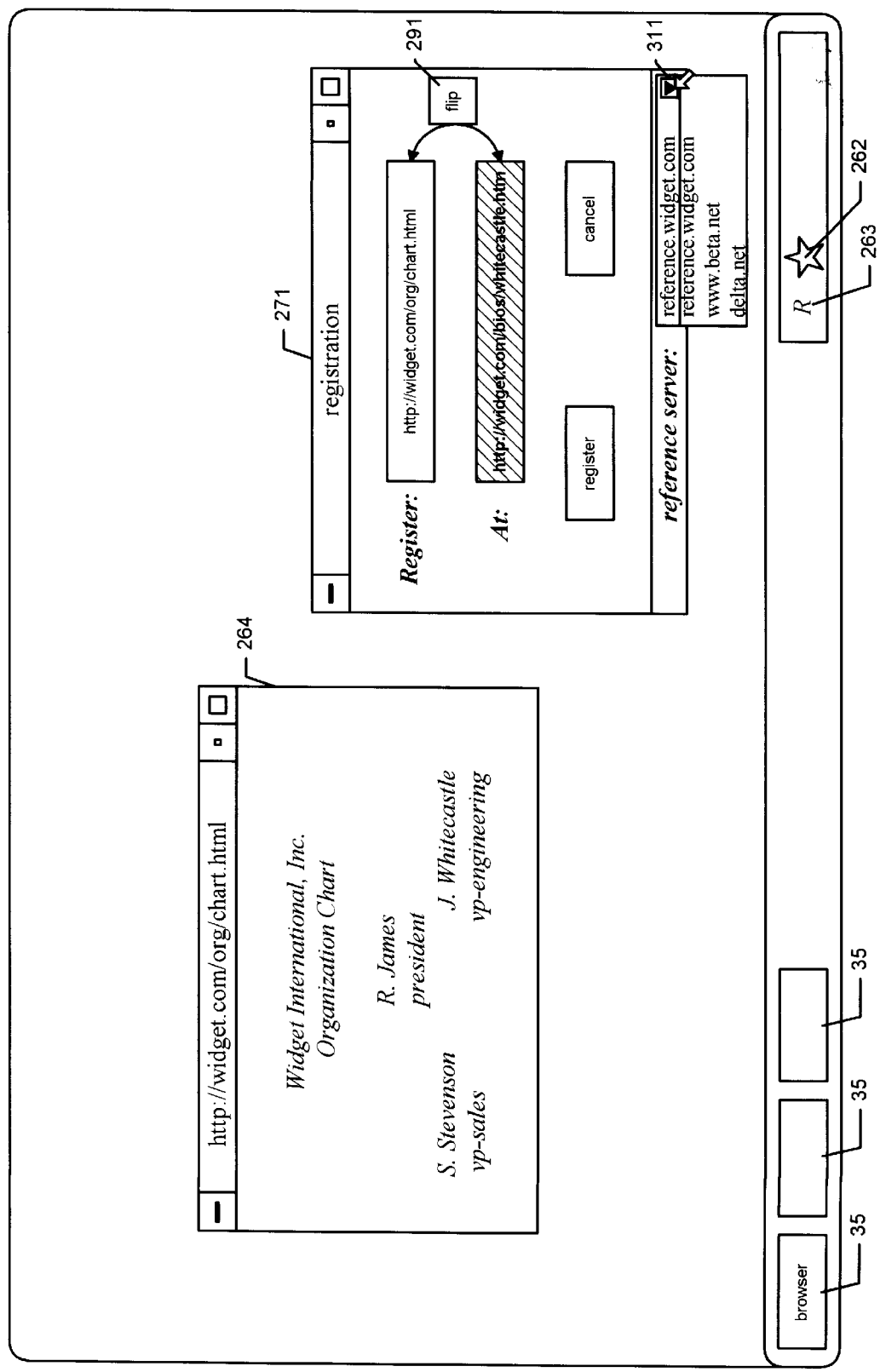

As shown in FIG. 31, the user may also select the reference server on which the URLs are to be registered by selecting the drop-down display element 311 in FIG. 31. Shown are the reference servers the user may access for registration. In some embodiments, the user may also enter the identity of another reference server that is not on the list.

Figure 32B:
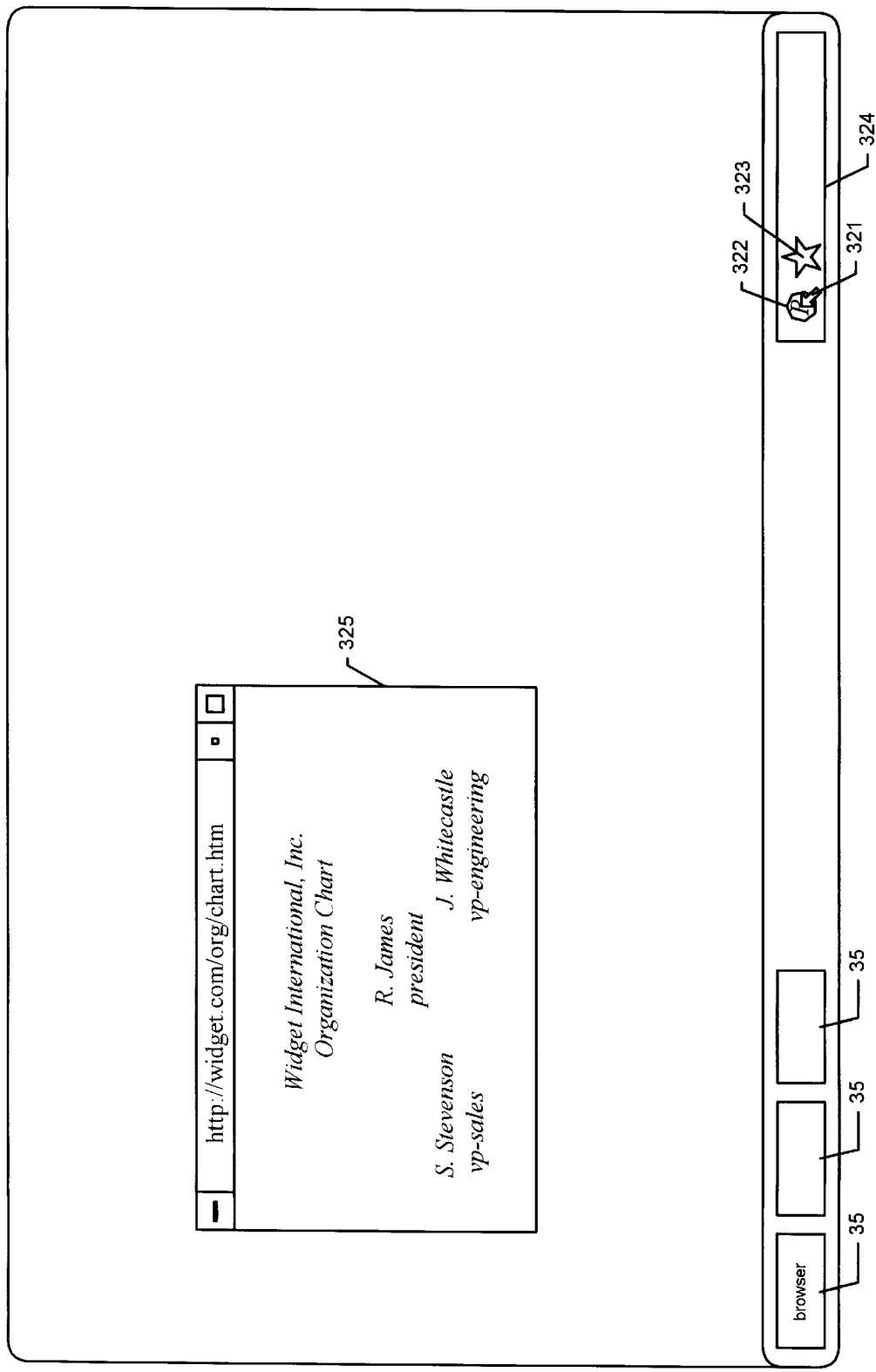
Figure 32C:
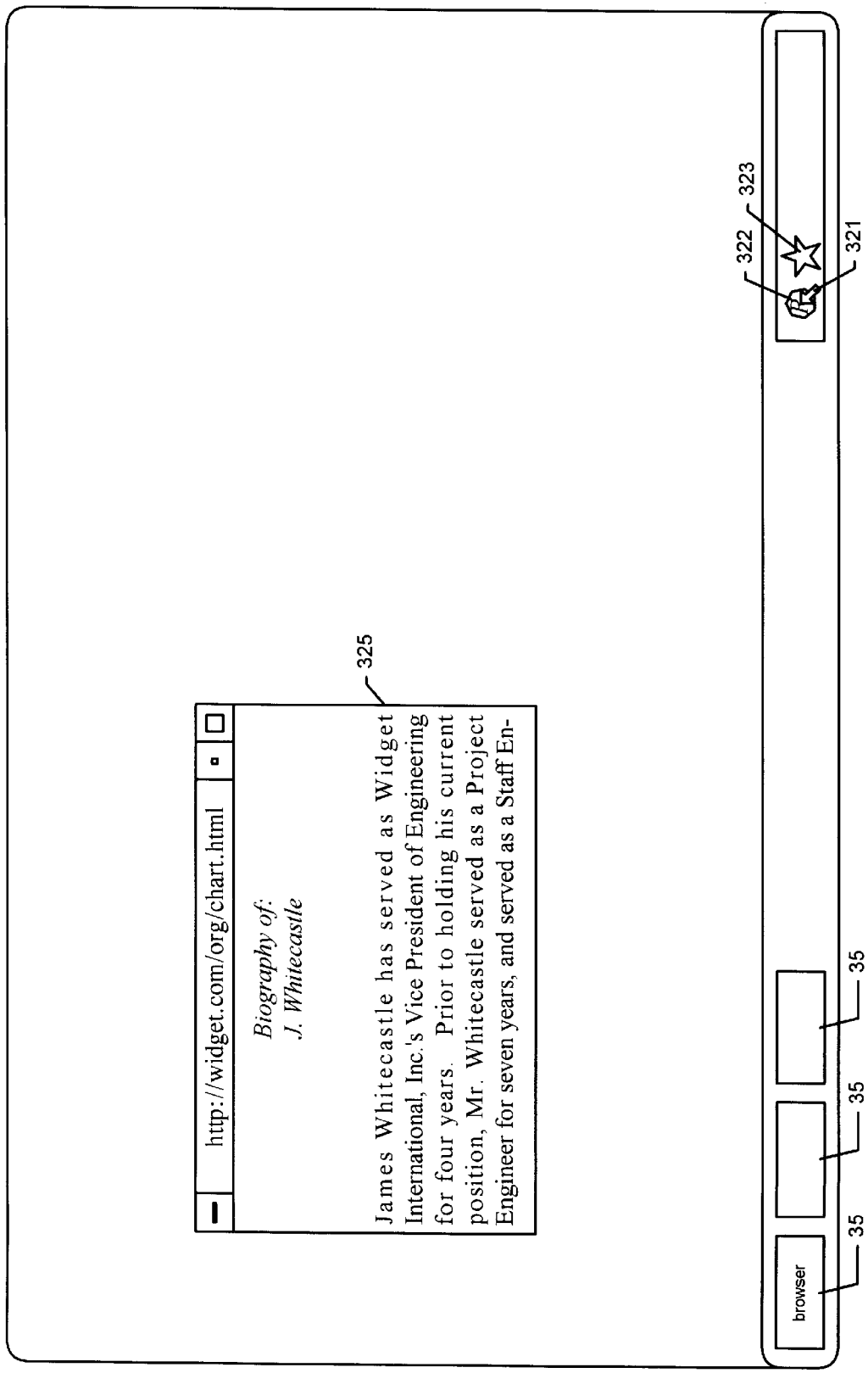
Figure 32D:
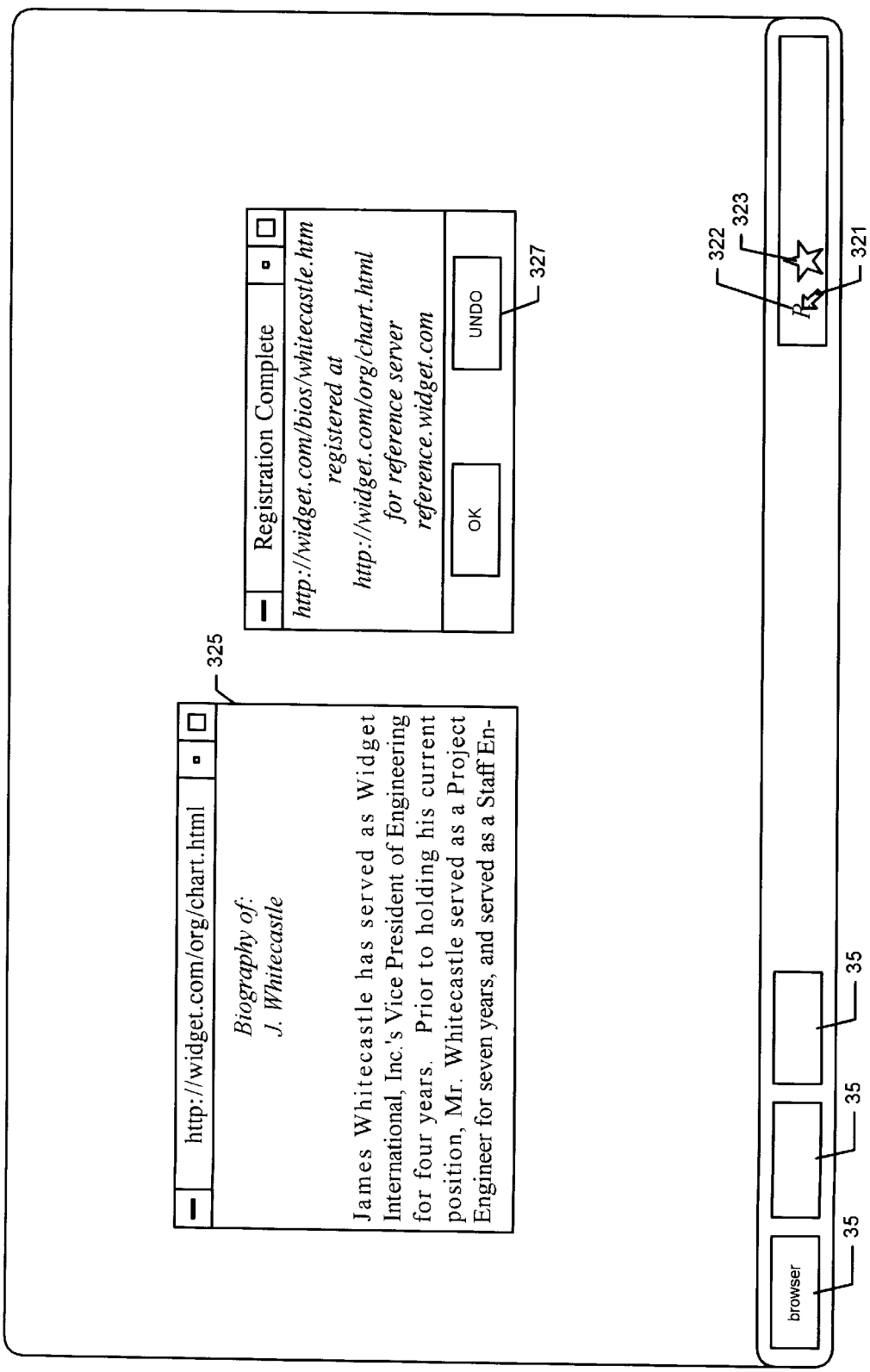

FIGS. 32a to 32d illustrate an alternate procedure for registering supplemental information. In FIG. 32a, the user has browsed to the page or document that the user wishes to register, and has selected with cursor 321 the display element 322 on the icon tray 324. Upon selection of the display element 322, the display element 322 is highlighted or changed in some way, as shown in FIG. 32b, to indicate that it has been selected. In FIG. 32c, the user has browsed to the page at which he or she wishes to register the prior page, and is selecting the display element 322. Upon selecting the display element 322 in FIG. 32c, the display element changes its appearance again, as shown in FIG. 32d, and then a window 3208 is shown on the display to confirm the details of the registration. Although not shown in FIG. 32d, the user may also be given the option to select or change the reference server on which the registration is taking place. If necessary, the user can undo the registration by selecting the button 327.

For purposes of illustration and example, the present invention has been described principally in terms of computer network-available documents, pages, or web pages containing text. It should be understood that the present invention is not limited to only those particular types of network resources. Rather, the present invention can be implemented using other types of documents that include graphics, animated graphics or other objects. The present invention is also applicable to other types of network resources generally, such as audio, video, or other types of multimedia. For example, network resources, including supplemental information, could be in the form of an audio clip, or an applet or application program. Supplemental information that are applications may carry out a function that relates to the resource displayed or otherwise presented to the user. It should also be understood that procedures that have been described in connection with a textual document or page being "displayed" in a window or on a display screen are also applicable to the presentation of other types of network resources, such as, without limitation, network resources involving audio, video, applets, and/or applications.

Further, the network documents described and illustrated in many of the Figures herein are shown displayed within a window controlled by an application program, such as may be represented by window 34 in FIG. 3. It should be understood, however, that such documents (or resources) could be displayed in other ways. For example, the contents could be displayed on the entire desktop, or a portion of the desktop. In another embodiment, the contents might be scrolled on the screen, perhaps under other windows. Further, windows could be controlled by the operating system, rather than by an application program. In other embodiments, the browser and the window in which supplemental information could be integrated, or the windows described herein could be full-screen windows, perhaps having no overlap. The manner in which information has been shown being presented to the user herein should not interpreted as limiting the present invention.

The present invention has also been described in terms of internet protocols and procedures, including TCP/IP, HTTP, and HTML protocols. It should be understood that the present invention is not limited to such protocols, and that the present invention is applicable to other protocols, systems, or networks now known or hereinafter developed. Also, embodiments of the present invention may be integrated with one or more payment or transaction processing systems or the like so that a person viewing certain types of content and/or certain types of supplemental information or supplemental content will incur a fee or a transaction cost. Authentication and automatic payments techniques may also be used.

Generally, although the present invention has been shown and described with respect to specific embodiments and/or implementations, various changes and modifications, even if not shown or specifically described herein, may be applicable to the present invention, and are deemed to lie within the spirit and scope of the present invention as defined by the appended claims. Any specific features or aspects of the embodiments or implementations described or illustrated herein are not intended to limit the present invention in a manner not required by the appended claims.

INCORPORATION BY REFERENCE

The following pending U.S. patent applications are hereby fully incorporated by reference into this application: application Ser. No. 08/474,921 (entitled "Document Retrieval System Employing a Preloading Procedure"), filed Jun. 7, 1995, now U.S. Pat. No. 5,715,445, Ser. No. 08/487,925 (entitled "Document Research System and Method for Displaying Citing Documents"), filed Jun. 7, 1995; Ser. No. 60/028,251 (entitled "A Method and System for Communicating Information About the Contents of a Document"), filed Oct. 8, 1996; Ser. No. 60/047,554 ("A Document Retrieval System Including the Use of Profile Information"), filed May 22, 1997; Ser. No. 60/052,830 ("A System and Method for Communicating Information Relating to a Network Resource"), filed Jul. 17, 1997; and Ser. No. 08/936,910 (entitled "A System and Method of Communicating Information Relating to a Network Resource"), filed Sept. 25, 1997.

In addition, the following publications listed below are also hereby fully incorporated by reference to the extent that they enable, provide support for, provide a background for, or teach methodology, techniques, and/or procedures employed herein.

Reference 1: Yellin, The Java Application Programming Interface: Volumes 1 & 2 (Addison Wesley 1996)

Reference 2: Campione, The Java Tutorial (Addison Wesley 1996)

Reference 3: Chan, The Java Class Libraries (Addison Wesley 1997)

Reference 4: Lemay et al., Java in 21 Days (Sams.Net 1996)

Reference 5: Sun Microsystems, Inc., The JavaBeans 1.0 API Specification (Sun Microsystems 1996) (available at http://java.sun.com/beans)

Reference 6: Sun Microsystems, Inc., The Java 1.1 API Specification (Sun Microsystems 1997) (available at http://java.sun.com/)

Reference 7: Bell, "Make Java fast: Optimize!," JavaWorld April 1997 (JavaWorld 1997) (available at http://www.javaworld.com/)

Reference 8: Vanhelsuwe, "How to make Java applets start faster," JavaWorld December 1996 (JavaWorld 1996) (available at http://www.javaworld.com/)

Reference 9: Danesh, JavaScript in a Week (Sams.Net 1996)

Reference 10: Graham, HTML Sourcebook (2d ed. John Wiley & Sons 1996)

Reference 11: Tanenbaum, Computer Networks (2d ed. Prentice Hall 1989)

Reference 12: Jamsa, Internet Programming (Jamsa Press 1995)

Reference 13: Comer, Internetworking with TCP/IP, Volumes 1, 2, & 3 (3d ed. Prentice Hall 1995)

Reference 14: Lemay, Official Marimba Guide to Castanet (Sams.Net 1997)

Reference 15: Kovel et al., The Lotus Notes Idea Book (Addison Wesley 1996)

Reference 16: Schneier, Applied Cryptography ($2^{nd}$ ed. John Wiley & Sons 1996)

Reference 17: Adkins, Internet Security Professional Reference (New Riders 1996)

Reference 18: Chappell, Understanding ActiveX and OLE (Microsoft Press 1996)

Reference 19: Denning, OLE Controls Inside Out (Microsoft 1995)

Reference 20: Brockschmidt, Inside OLE (2d ed. Microsoft 1995)

Reference 21: Siegel, CORBA Fundamentals and Programming (John Wiley & Sons 1996)

Reference 22: Petzold, Programming Windows 95 (Microsoft 1996)

Reference 23: Prosise, Programming Windows 95 with MFC (Microsoft Press 1996)

Reference 24: Microsoft Corporation, Windows NT Server Resource Kit (Microsoft Press 1996)

Reference 25: Russel, Running Windows NT Server (Microsoft Press 1997)

Reference 26: Chapman, Building Internet Applications with Delphi 2 (Que 1996)

Reference 27: Cantu, Mastering Delphi 3 (Sybex 1997)

What is claimed is:

1. A method of displaying information on a display screen for a user, the method comprising the acts of:

retrieving over a network a first hypertext document, wherein the first hypertext document is retrieved over the network from a first server that is operated by a first publisher;

displaying the first hypertext document on the display screen for the user, wherein the first hypertext document is published by the first publisher, and wherein the first hypertext document contains links to a plurality of documents;

detecting that the first hypertext document is being displayed on the screen for the user;

upon detecting that the first hypertext document is being displayed, automatically sending information identifying the first hypertext document being displayed for the user over the network to a supplemental information server, wherein the supplemental information server is operated by an entity that is different than the first publisher;

displaying a supplemental information display element on the display screen;

monitoring the user's selection of the supplemental information display element;

displaying supplemental information for the first hypertext document on the display screen when the user selects the supplemental information display element, wherein the supplemental information for the first hypertext document is published by an entity that is different than the first publisher, wherein the supplemental information for the first hypertext document is relevant to the contents of the first hypertext document, wherein the supplemental information for the first hypertext document includes a link to a second hypertext document that is relevant to the contents of the first hypertext document and is not linked to by the first hypertext document as published by the first publisher, and wherein the second hypertext document is published by a second publisher, which is an entity that is different than the first publisher;

automatically removing the supplemental information for the first hypertext document from the display screen when the user requests a third hypertext document;

retrieving over the network the third hypertext document, wherein the third hypertext document is retrieved over the network from a third server that is operated by a third publisher;

displaying the third hypertext document on the display screen for the user, wherein the third hypertext document is published by the third publisher, and wherein the third hypertext document contains links to a plurality of documents;

detecting that the third hypertext document is being displayed on the screen for the user;

upon detecting that the third hypertext document is being displayed, automatically sending information identifying the third hypertext document over the network to the supplemental information server;

monitoring the user's selection of the supplemental information display element; and displaying supplemental information for the third hypertext document on the display screen when the user selects the supplemental information display element, wherein the supplemental information for the third hypertext document is published by an entity that is different than the third publisher, wherein the supplemental information for the third hypertext document includes a link to a fourth hypertext document, wherein the fourth hypertext document is relevant to the contents of the third hypertext document and is not linked to by the third hypertext document as published by the third publisher, and wherein the fourth hypertext document is published by a fourth publisher, which is an entity that is different than the third publisher.

2. The method of claim 1, wherein the act of displaying a supplemental information display element on the display screen includes the act of changing the appearance of the supplemental information display element when supplemental information is available for the displayed hypertext document.

3. The method of claim 1, further comprising the acts of:

retrieving over the network the fourth hypertext document;

displaying the fourth hypertext document on the display screen for the user;

automatically sending information identifying the fourth hypertext document over the network to the supplemental information server;

monitoring the user's selection of the supplemental information display element; and displaying information on the display screen when the user selects the supplemental information display element, wherein the information communicates to the user that no supplemental information is available for the fourth hypertext document.

4. A method of displaying information on a display screen for a user, the method comprising the acts of:

retrieving over a network a first hypertext document, wherein the first hypertext document is retrieved over the network from a first server that is operated by a first publisher;

displaying the first hypertext document on the display screen for the user, wherein the first hypertext document is published by the first publisher, and wherein the first hypertext document contains links to a plurality of documents;

detecting that the first hypertext document is being displayed on the screen for the user;

upon detecting that the first hypertext document is being displayed, automatically sending information identifying the first hypertext document over the network to a supplemental information server, wherein the supplemental information server is operated by an entity that is different than the first publisher;

displaying a supplemental information display element on the display screen;

monitoring the user's selection of the supplemental information display element;

displaying supplemental information for the first hypertext document on the display screen with the first hypertext document when the user selects the supplemental information display element, wherein the supplemental information for the first hypertext document is published by an entity that is different than the first publisher, wherein the supplemental information for the first hypertext document is relevant to the contents of the first hypertext document, wherein the supplemental information for the first hypertext document includes a link to a second hypertext document, wherein the second hypertext document is relevant to the contents of the first hypertext document but a link to the second hypertext document was not included in the first hypertext document by the first publisher, and wherein the second hypertext document is published by a second publisher, which is an entity that is different than the first publisher;

monitoring the user's selection of the link to the second hypertext document included in the supplemental information for the first hypertext document;

retrieving over the network the second hypertext document when the user selects the link to the second hypertext document included in the supplemental information for the first hypertext document, displaying the second hypertext document on the display screen for the user by replacing the first hypertext document displayed on the display screen with the second hypertext document;

detecting that the second hypertext document is being displayed on the screen for the user;

upon detecting that the second hypertext document is being displayed, automatically sending information identifying the second hypertext document over the network to the supplemental information server;

monitoring the user's selection of the supplemental information display element;

displaying supplemental information for the second hypertext document on the display screen with the second hypertext document when the user selects the supplemental information display element, wherein the supplemental information for the second hypertext document is published by an entity that is different than the second publisher, wherein the supplemental information for the second hypertext document includes a link to a third hypertext document that is published by a third publisher, wherein the third hypertext document is relevant to the contents of the second hypertext document but a link to the third hypertext document was not included in the second hypertext document by the second publisher, and wherein the third hypertext document is published by a third publisher, which is an entity that is different than the first publisher and the second publisher.

5. The method of claim 4, wherein the act of displaying a supplemental information for the first hypertext document includes the act of displaying display elements that control the display of the supplemental information.

6. The method of claim 4, wherein the act of displaying a supplemental information display element on the display screen includes the act of changing the appearance of the supplemental information display element when supplemental information is available for the displayed hypertext document.

7. The method of claim 4, further comprising the acts of:

retrieving over the network the third hypertext document;

displaying the third hypertext document on the display screen for the user;

automatically sending information identifying the third hypertext document over the network to the supplemental information server;

monitoring the user's selection of the supplemental information display element; and displaying information on the display screen when the user selects the supplemental information display element, wherein the information communicates to the user that no supplemental information is available for the third hypertext document.

8. The method of claim 4, wherein the act of displaying a supplemental information display element on the display screen includes the act of displaying a menu when the supplemental information display element is selected with a special selection action, wherein the menu includes a selection relating to configuration operations.

9. The method of claim 4, further comprising the acts of:

displaying an area in which to enter the URL of a document to be made available as supplemental information when a user views the second hypertext document.

\* \* \* \* \*